US012785860B2

(12) United States Patent
Esswie

(10) Patent No.: US 12,785,860 B2
(45) Date of Patent: Nov. 3, 2026

(54) ADAPTIVE NON-TERRESTRIAL PACKET RETRANSMISSIONS

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 18/598,659

(22) Filed: Mar. 7, 2024

(65) Prior Publication Data

US 2025/0286663 A1 Sep. 11, 2025

(51) Int. Cl.
*H04L 1/1812* (2023.01)
*H04B 7/185* (2006.01)

(52) U.S. Cl.
CPC ....... *H04L 1/1819* (2013.01); *H04B 7/18513* (2013.01)

(58) Field of Classification Search
CPC .......................... H04L 1/1819; H04B 7/18513
See application file for complete search history.

(56) References Cited

U.S. PATENT DOCUMENTS

2020/0228194 A1* 7/2020 Hassan Hussein ... H04L 1/1822
2022/0286400 A1* 9/2022 Park .................... H04L 47/2416
2023/0259789 A1* 8/2023 Wang ..................... G06N 3/082 706/25
2024/0121778 A1* 4/2024 Elshafie ................ H04L 1/1822
2024/0260041 A1* 8/2024 Lu ......................... H04L 1/1812
2026/0046868 A1* 2/2026 Liu ....................... H04L 5/0064

* cited by examiner

*Primary Examiner* — Michael Thier
*Assistant Examiner* — Nevena Zecevic Sandhu
(74) *Attorney, Agent, or Firm* — Amin, Turocy & Watson, LLP

(57) ABSTRACT

A user equipment may receive downlink traffic packets according to a communication session with a non-terrestrial network node. The user equipment may request that retransmission of payload packet(s) transmitted by the non-terrestrial node to the user equipment that is/are unsuccessfully decoded by the user equipment be delegated to a terrestrial radio access network node. The user equipment may include modulation and coding scheme information and redundancy version information in a request to the terrestrial node for delegated retransmission of unsuccessfully decoded packet received from the non-terrestrial node. The terrestrial node may request and receive, from core network equipment or non-terrestrial node equipment, payload packet(s) for which the user equipment requested delegated retransmission, and may retransmit, to the user equipment, the requested payload according to the modulation and coding scheme and a next redundancy value with respect to transmission by the non-terrestrial node of the unsuccessfully decoded payload packet(s).

20 Claims, 16 Drawing Sheets

200

300

315

700

900

1000

1100

1200

1300

1400

ADAPTIVE NON-TERRESTRIAL PACKET RETRANSMISSIONS

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a terrestrial radio network node comprising at least one processor, receiving, from a user equipment, a delegated hybrid automatic repeat request comprising at least one protocol data unit identifier indicative of at least one unsuccessfully received protocol data unit corresponding to at least one non-terrestrial downlink traffic flow. The method may further comprise facilitating, by the terrestrial radio network node, transmitting, to a non-terrestrial network component, a non-terrestrial payload fetch request comprising the at least one protocol data unit identifier, facilitating, by the terrestrial radio network node, receiving, from the non-terrestrial network component, at least one retransmitted protocol data unit corresponding to the at least one protocol data unit identifier, and facilitating, by the terrestrial radio network node, transmitting, to the user equipment, the at least one retransmitted protocol data unit.

The at least one unsuccessfully received protocol data unit may be directed to the user equipment. In an embodiment, the user equipment may be a first user equipment and the at least one unsuccessfully received protocol data unit may be directed to a second user equipment. The first user equipment may be an extended reality processing unit and the second user equipment maybe an extended reality appliance with respect to which the extended reality processing unit, or the first user equipment, is facilitating relaying of traffic with a non-terrestrial network node.

The non-terrestrial network component may comprise a non-terrestrial network gateway, a user plane function, or a non-terrestrial network node. The user plane function may be a component of a core network. The at least one unsuccessfully received protocol data unit may have been transmitted to the user equipment by a non-terrestrial network node.

The at least one unsuccessfully received protocol data unit may comprise at least one packet of a group of non-terrestrial downlink packets, and wherein the at least one protocol data unit identifier is indicative of the group of non-terrestrial downlink packets. The at least one protocol data unit identifier may comprise a sequence number.

The delegated hybrid automatic repeat request may further comprise at least one of: a target non-terrestrial network node identifier corresponding to a non-terrestrial network node that transmitted the at least one unsuccessfully received protocol data unit, a redundancy version indication indicative of a redundancy version corresponding to the at least one unsuccessfully received protocol data unit, or a modulation and coding indication indicative of modulation and coding information used to transmit the at least one unsuccessfully received protocol data unit.

The modulation and coding information may correspond to a modulation and coding scheme. The facilitating of the transmitting of the at least one retransmitted protocol data unit may comprise facilitating the transmitting according to the modulation and coding information used to transmit the at least one unsuccessfully received protocol data unit.

The redundancy version may be a first redundancy version, and wherein the facilitating of the transmitting of the at least one retransmitted protocol data unit comprises facilitating the transmitting according to a second redundancy version that is sequentially subsequent to the first redundancy version. In an embodiment, the modulation and coding information may correspond to a default modulation and decoding scheme and the second redundancy version may be a next available redundancy version that is not sequentially related to the first redundancy version.

In an embodiment, the method may comprise facilitating, by the terrestrial radio network node, transmitting, to the user equipment, a delegated hybrid automatic repeat request combine indication indicative to the user equipment to enable combination of the at least one unsuccessfully received protocol data unit and the at least one retransmitted protocol data unit. The delegated hybrid automatic repeat request combine indication may be transmitted to the user equipment, by the terrestrial network node, along with, or in conjunction with, the at least one retransmitted protocol data unit.

In an embodiment, a redundancy version indication may be absent from the delegated hybrid automatic repeat request. the method may further comprise determining, by the terrestrial radio network node, at least one channel condition parameter metric corresponding to a communication link between the terrestrial radio network node and the user equipment. Based on the at least one channel condition parameter metric, the method may further comprise determining, by the terrestrial radio network node, a modulation and coding scheme, wherein the facilitating of the transmitting of the at least one retransmitted protocol data unit comprises facilitating the transmitting according to the modulation and coding scheme.

In an embodiment, the method may further comprise determining, by the terrestrial radio network node, a redundancy version to result in a locally-determined redundancy version, wherein the facilitating of the transmitting of the at least one retransmitted protocol data unit is facilitating the transmitting according to the locally-determined redundancy version. The method may further comprise facilitating, by the terrestrial radio network node, transmitting, to the user equipment, a non-combine indication indicative to the user equipment to avoid combining the at least one retransmitted protocol data unit with the at least one unsuccessfully received protocol data unit. The non-combine indication may be transmitted if the delegated hybrid automatic repeat request does not indicate modulation and coding information or redundancy version information corresponding to the at least one protocol data unit, terrestrial port node to the user equipment, that is being retransmitted by the terrestrial network node.

In another example embodiment, a terrestrial radio network node may comprise at least one processor configured to process executable instructions that, when executed by the at least one processor, facilitate performance of operations that may comprise receiving, from a user equipment, a delegated hybrid automatic repeat request comprising at least one packet identifier indicative of at least one unsuccessfully received packet corresponding to at least one non-terrestrial downlink traffic flow. The operations may further comprise transmitting, to a core network component, a non-terrestrial payload fetch request comprising the at least one packet identifier. Responsive to the non-terrestrial payload fetch request, the operations may further comprise receiving, from the core network component, at least one retransmitted packet corresponding to the at least one packet. The operations may comprise transmitting, to the user equipment, the at least one retransmitted packet.

The delegated hybrid automatic repeat request may further comprise at least one of: a target non-terrestrial network node identifier corresponding to a non-terrestrial network node that transmitted the at least one unsuccessfully received packet, a redundancy version indication indicative of a redundancy version corresponding to the at least one unsuccessfully received packet, or a modulation and coding indication indicative of modulation and coding information used to transmit the at least one unsuccessfully received packet.

In an embodiment, the redundancy version may be a first redundancy version. The transmitting of the at least one retransmitted packet may be facilitated according to a second redundancy version that is sequentially subsequent to the first redundancy version and according to the modulation and coding information used to transmit the at least one unsuccessfully received packet.

In an embodiment, the operations may further comprise facilitating, by the terrestrial radio network node, transmitting, to the user equipment, a delegated hybrid automatic repeat request combine indication indicative to the user equipment to enable combining of the at least one unsuccessfully received packet and the at least one retransmitted packet.

In yet another example embodiment, a non-transitory machine-readable medium may comprising executable instructions that, when executed by at least one processor of a terrestrial radio network node, facilitate performance of operations that may comprise receiving, from a user equipment, a delegated hybrid automatic repeat request comprising at least one packet identifier indicative of at least one unsuccessfully received packet, corresponding to at least one non-terrestrial downlink traffic flow, transmitted to the user equipment by a non-terrestrial network node and a non-terrestrial network node identifier corresponding to the non-terrestrial network node. The operations may further comprise transmitting, to a core network component, a non-terrestrial payload fetch request comprising the at least one packet identifier and the non-terrestrial network node identifier, receiving, from the core network component, at least one retransmitted packet corresponding to the at least one packet identifier, and transmitting, to the user equipment, the at least one retransmitted packet.

In an embodiment, the delegated hybrid automatic repeat request may further comprise at least one of: a redundancy version indication indicative of a redundancy version corresponding to the at least one unsuccessfully received packet, or a modulation and coding indication indicative of modulation and coding information used to transmit the at least one unsuccessfully received packet.

In an embodiment, the redundancy version may be a first redundancy version. The transmitting of the at least one retransmitted packet may be facilitated according to a second redundancy version that is sequentially subsequent, with respect to a circular sequence, to the first redundancy version and according to the modulation and coding information used to transmit the at least one unsuccessfully received packet. The operations may further comprise transmitting, to the user equipment, a delegated hybrid automatic repeat request combine indication indicative to the user equipment to enable the at least one unsuccessfully received protocol data unit and the at least one retransmitted packet to be combined.

In an embodiment, a redundancy version indication may be absent from the delegated hybrid automatic repeat request. The operations may further comprise determining at least one channel condition parameter metric corresponding to a communication link between the terrestrial radio network node and the user equipment. Based on the at least one channel condition parameter metric, the operations may further comprise determining, by the terrestrial radio network node, a modulation and coding scheme, wherein the transmitting of the at least one retransmitted packet is facilitated according to the modulation and coding scheme, determining, by the terrestrial radio network node, a redundancy version to result in a locally-determined redundancy version. The transmitting of the at least one retransmitted packet may be further facilitated according to the locally-determined redundancy version. The operations may further comprise transmitting, to the user equipment, a non-combine indication indicative to the user equipment to prevent the at least one retransmitted packet and the at least one unsuccessfully received packet from being combined.

In another example method embodiment, a method may comprise receiving, by a user equipment comprising at least one processor from a non-terrestrial network node, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one protocol data unit transmitted to the user equipment by the non-terrestrial network node. The method may further comprise determining, by the user equipment, that at least one protocol data unit, corresponding to at least one non-terrestrial downlink traffic flow and received from the non-terrestrial network node, is unsuccessfully received to result in at least one unsuccessfully received protocol data unit. The method may further comprise transmitting, by the user equipment to the terrestrial radio network node, a delegated hybrid automatic repeat request comprising at least one protocol data unit identifier indicative of the at least one unsuccessfully received protocol data unit. Responsive to the transmitting of the delegated hybrid automatic repeat request, the method may further comprise receiving, by the user equipment from the terrestrial radio network node, at least one terrestrial retransmitted protocol data unit corresponding to the at least one protocol data unit identifier. The delegated hybrid automatic repeat request configuration is received via a radio resource control signal.

The delegated hybrid automatic repeat request configuration may comprise at least one non-terrestrial downlink traffic identifier indicative of at least one downlink bearer or at least one downlink traffic flow with respect to which transmission, by the user equipment to the terrestrial radio network node, of the at least one delegated hybrid automatic repeat request is enabled.

In an embodiment, the method may further comprise determining, by the user equipment, a remaining time budget corresponding to retransmission, by the non-terrestrial network node to the user equipment, of the at least one unsuccessfully received protocol data unit to result in a determined remaining time budget, analyzing, by the user equipment, the determined remaining time budget with respect to a latency criterion to result in an analyzed determined remaining time budget, and determining, by the user equipment, to facilitate the transmitting of the delegated hybrid automatic repeat request based on the analyzed determined remaining time budget being determined to violate the latency criterion. The latency criterion may be associated with a Quality-of-Service. The latency criterion may be associated with a traffic flow with respect to which the at least one unsuccessfully received protocol data unit corresponds. The latency criterion may be a time budget within which the at least one protocol data unit, that is unsuccessfully received, is to be successfully received and decoded by the user equipment.

In an embodiment, the determining of the determined remaining time budget may be based on a roundtrip time to transmit, by the user equipment to the non-terrestrial network node, a hybrid automatic repeat request negative acknowledgement, and to transmit, by the non-terrestrial network node to the user equipment in response to a hybrid automatic repeat request negative acknowledgement, a non-terrestrial at least one retransmitted protocol data unit corresponding to the at least one protocol data unit identifier. The determining of the determined remaining time budget may be further based on a decoding time corresponding to decoding of at least one of the at least one protocol data unit corresponding to at least one non-terrestrial downlink traffic flow.

The delegated hybrid automatic repeat request further comprises at least one of: a non-terrestrial network node identifier corresponding to the non-terrestrial network node; a redundancy version indication indicative of a redundancy version corresponding to transmission by the non-terrestrial network node of the determined at least one unsuccessfully received protocol data unit; or a modulation and coding scheme indication indicative of a modulation and coding scheme corresponding to transmission by the non-terrestrial network node of the at least one unsuccessfully received protocol data unit.

In an embodiment, the redundancy version may be a first redundancy version. The at least one terrestrial retransmitted protocol data unit may be transmitted by the terrestrial radio network node to the user equipment according to a second redundancy version that is sequentially subsequent to the first redundancy version. The method may further comprise combining, by the user equipment, the at least one terrestrial retransmitted protocol data unit with the at least one unsuccessfully received protocol data unit based on the second redundancy version and the second redundancy version respectively, to result in at least one combined protocol data unit, and decoding, by the user equipment, the at least one combined protocol data unit.

The at least one protocol data unit identifier may comprise at least one sequence number corresponding to the at least one unsuccessfully received protocol data unit. The at least one protocol data unit identifier may be usable by the terrestrial radio network node to retrieve, from a core network component, the at least one terrestrial retransmitted protocol data unit.

In an embodiment, the at least one unsuccessfully received protocol data unit may be at least one first unsuccessfully received non-terrestrial protocol data unit. The determined remaining time budget may be a first determined remaining time budget. The analyzed determined remaining time budget may be a first analyzed determined remaining time budget. The, at least one terrestrial retransmitted protocol data unit may be at least one first terrestrial retransmitted protocol data unit. The at least one protocol data unit identifier may be at least one first protocol data unit identifier. The method may further comprise determining, by the user equipment, that at least one second non-terrestrial protocol data unit, received from the non-terrestrial network node, is unsuccessfully received to result in at least one second unsuccessfully received protocol data unit, determining, by the user equipment, a second remaining time budget corresponding to retransmission, by the non-terrestrial network node to the user equipment, of the at least one second unsuccessfully received protocol data unit to result in a second determined remaining time budget, and analyzing, by the user equipment, the second determined remaining time budget with respect to the latency criterion to result in a second analyzed determined remaining time budget. Based on the second analyzed determined remaining time budget being determined to satisfy the latency criterion, the method may further comprise transmitting, by the user equipment to the non-terrestrial network node, a hybrid automatic repeat request negative acknowledgement comprising at least one second protocol data unit identifier indicative of the at least one second unsuccessfully received protocol data unit. Responsive to the transmitting of the hybrid automatic repeat request negative acknowledgment, the method may further comprise receiving, by the user equipment from the non-terrestrial network node, at least one second terrestrial retransmitted protocol data unit corresponding to the at least one second protocol data unit identifier.

In an embodiment, a redundancy version indication may be absent from the delegated hybrid automatic repeat request. The receiving of the at least one terrestrial retransmitted protocol data unit corresponding to the at least one protocol data unit identifier may be facilitated according to a default redundancy version. The method may comprise flushing, by the user equipment from a memory corresponding to the user equipment, the at least one unsuccessfully received protocol data unit, and decoding, by the user equipment, the at least one terrestrial retransmitted protocol data unit.

In an embodiment, a modulation and coding scheme indication may be absent from the delegated hybrid automatic repeat request. The receiving of the at least one terrestrial retransmitted protocol data unit corresponding to the at least one protocol data unit identifier may be facilitated according to a default modulation and coding scheme configured in the user equipment.

In an embodiment, a modulation and coding scheme indication may be absent from the delegated hybrid automatic repeat request. the method may further comprise determining, by the user equipment, a modulation and coding scheme corresponding to the terrestrial radio network node based on at least one channel condition parameter metric corresponding to a communication link between the terrestrial radio network node and the user equipment to result in a determined modulation and coding scheme, wherein the receiving of the at least one terrestrial retransmitted protocol data unit corresponding to the at least one protocol data unit identifier is facilitated according to the determined modulation and coding scheme.

In another example, embodiment, a user equipment may comprise at least one processor configured to process executable instructions that, when executed by the at least one processor, facilitate performance of operations that may comprise receiving, from a non-terrestrial network node, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one protocol data unit transmitted to the user equipment by the non-terrestrial network node. The operations may comprise determining that at least one packet, corresponding to at least one non-terrestrial downlink traffic flow and received from the non-terrestrial network node, is unsuccessfully received to result in at least one unsuccessfully received packet. The operations may further comprise determining a remaining time budget corresponding to retransmission, by the non-terrestrial network node to the user equipment, of the at least one unsuccessfully received packet to result in a determined remaining time budget, analyzing the determined remaining time budget with respect to a latency criterion to result in an analyzed determined remaining time budget. Based on the analyzed determined remaining time budget being determined to violate the latency criterion, the operations may further comprise transmitting, to the terrestrial radio network node, the delegated hybrid automatic repeat request comprising at least one packet identifier indicative of the at least one unsuccessfully received packet. Responsive to the transmitting of the delegated hybrid automatic repeat request, the operations may further comprise receiving, from the terrestrial radio network node, at least one terrestrial retransmitted packet corresponding to the at least one packet identifier.

In an embodiment, the at least one packet identifier may comprise at least one sequence number corresponding to the at least one unsuccessfully received packet. The at least one packet identifier is usable by the terrestrial radio network node to retrieve, from a core network component, the at least one terrestrial retransmitted packet.

In an embodiment, the at least one packet identifier may comprise at least one sequence number corresponding to the at least one unsuccessfully received packet. The at least one packet identifier is usable by the terrestrial radio network node to retrieve, via a non-terrestrial gateway corresponding to the non-terrestrial network node, the at least one terrestrial retransmitted packet.

In yet another example embodiment, a non-transitory machine-readable medium may comprise executable instructions that, when executed by at least processor of a user equipment, facilitate performance of operations that may comprise receiving, from a non-terrestrial network node, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one packet transmitted to the user equipment by the non-terrestrial network node. The operations may further comprise determining that at least one packet, corresponding to at least one non-terrestrial downlink traffic flow, received from the non-terrestrial network node is unsuccessfully received to result in at least one packet determined to be unsuccessfully received. Based on a delegated hybrid automatic repeat request retransmission being indicated in the delegated hybrid automatic repeat request configuration being enabled with respect to the at least one non-terrestrial downlink traffic flow, the operations may further comprise determining to transmit, to the terrestrial radio network node, the delegated hybrid automatic repeat request comprising at least one packet identifier indicative of the at least one packet determined to be unsuccessfully received to result in a determined delegated hybrid automatic repeat request. The operations may further comprise transmitting, to the terrestrial radio network node, the determined delegated hybrid automatic repeat request, and, responsive to the transmitting of the delegated hybrid automatic repeat request, receiving, from the terrestrial radio network node, at least one terrestrial retransmitted packet corresponding to the at least one packet identifier.

The determining to transmit, to the terrestrial radio network node, the delegated hybrid automatic repeat request may further comprise determining a remaining time budget corresponding to retransmission, by the non-terrestrial network node to the user equipment, of the at least one packet determined to be unsuccessfully received to result in a determined remaining time budget, analyzing the determined remaining time budget with respect to a latency criterion to result in an analyzed determined remaining time budget, and determining to facilitate the transmitting of the delegated hybrid automatic repeat request based on the analyzed determined remaining time budget being determined to violate the latency criterion.

DETAILED DESCRIPTION OF THE DRAWINGS

Figure 1:
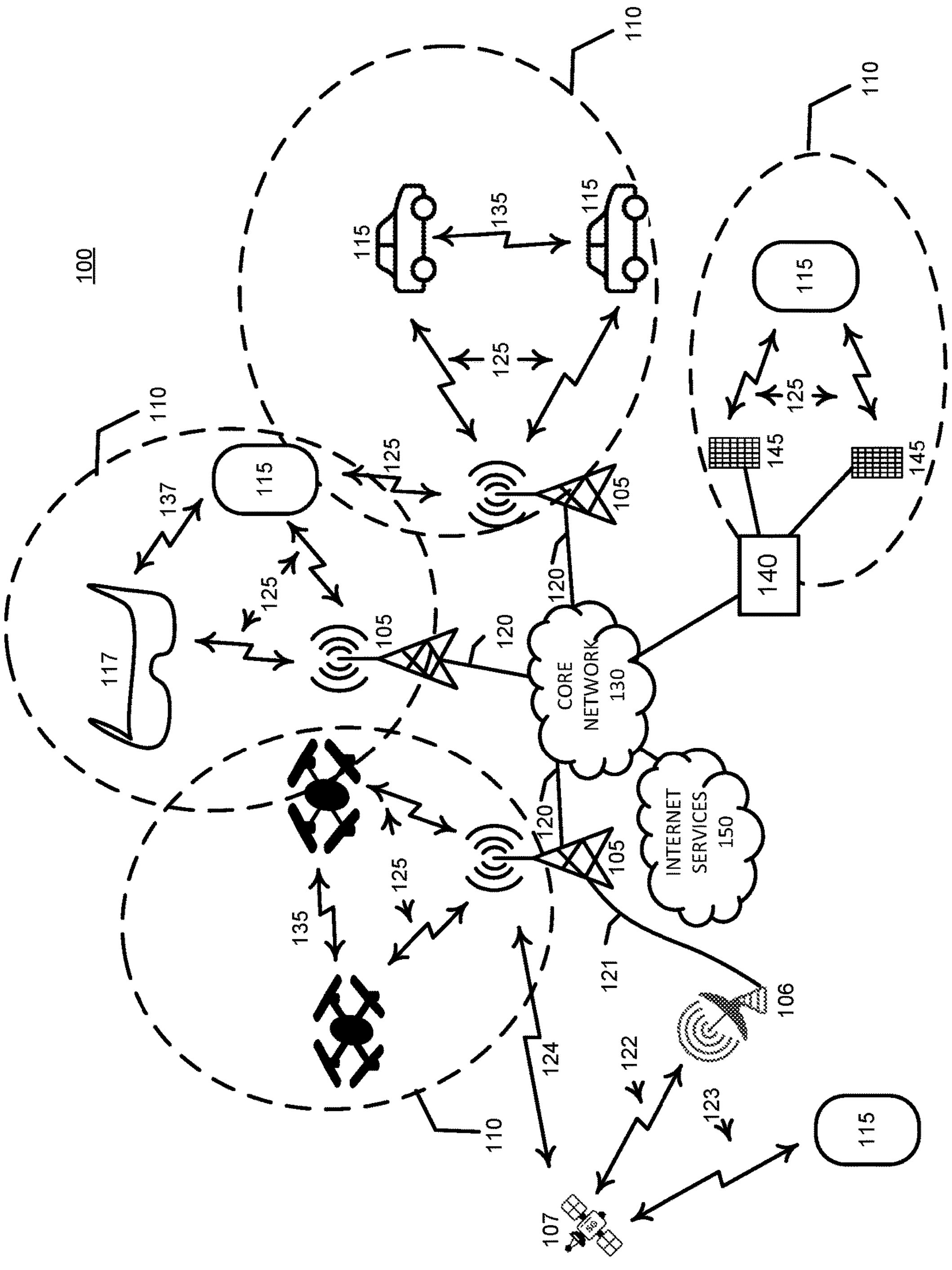
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, or a gateway 106, or a component thereof, may be implemented by one or more computer components that may be described in reference to FIG. 15.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHZ), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network gateway, and satellite 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 and 124 to satellite node 107, and links 123 from satellite/node 107 to UE 115, may comprise line-of-sight microwave signal transmission. A UE 115 may be configured with at least one antenna, or at least one processor, to facilitate transmitting or receiving microwave signals to/from satellite node 107. Description of herein, or reference to herein, a radio node or a radio network node may be a description or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial network node may be referred to as a "TN" node. Reference to a satellite node, or a non-terrestrial network node ("NTN node"), may comprise a reference to satellite 107, base station gateway 106, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Incorporating RAN node functionality on board a satellite to facilitate serving user equipment may give rise to performance-related problems, such as, for example, the exceptionally large payload retransmission round trip time ("RTT"), compared to payload retransmission RTT corresponding to conventional terrestrial-based communication between a TN RAN node and a user equipment. The larger RTT associated with NTN transmission may diminish the benefit of transmission of traffic via a non-terrestrial network. When an NTN payload packet, transmitted by a non-terrestrial network node to an NTN-capable user equipment, is not successfully decoded by an NTN device, a negative acknowledgement ("NACK") is typically transmitted by the user equipment device towards the satellite/NTN node, and, responsive to receiving the NACK, the NTN node retransmits the corresponding payload. Thus, a full NTN RTT delay would be the amount of time between the NTN-capable UE transmitting the NACK and receiving the payload retransmitted in response to receiving the NACK. A full RTT with respect to a UE transmitting a NACK to an NTN node and receiving a packet retransmitted in response thereto may be hundreds of milliseconds. For latency-critical downlink traffic flows a RTT hundreds of milliseconds in duration may result in a packet, retransmitted in response to a NACK, being a useless packet with respect to an application that may be executing at an NTN-capable user equipment, even before being delivered to the NTN-capable user equipment.

According to embodiments disclosed herein, latency-intolerant NTN downlink packet retransmissions may be dynamically routed via a TN/ground RAN node instead of the packets being delivered an NTN node, which may significantly reduce an experienced packet retransmission RTT delay due to a lower propagation delay corresponding to retransmission via the TN node compared to retransmission via the NTN node. According to embodiments disclosed herein, a ground/TN RAN node may retransmit NTN traffic payload, even if the TN RAN node did not facilitate attempted delivery of a previous transmission of payload to which the retransmitted payload corresponds. Because a previous payload transmission, facilitated by an NTN node, and respective one or more payload retransmissions, facilitated by a TN RAN node, are related, a mode of triggering a first and subsequent retransmission(s) may determine how subsequent payload versions should be combined or treated by a user equipment receiving the different retransmissions. Embodiments disclosed herein may facilitate enabling a TN RAN node to be dynamically updated with respect to basic transmission configuration information corresponding to a first transmission of payload via an NTN node such that the RAN node can fine tune triggering of the subsequent payload retransmissions to increase reception reliability corresponding to retransmitted packets.

Conventional techniques require that a RAN node retransmit packets that the node originally transmitted to a user equipment device. Embodiments disclosed herein may facilitate a TN RAN node retransmitting payload that was originally transmitted (e.g., as a first/original transmission) by another RAN node (e.g., a satellite/NTN node).

Conventional Modulation and Coding scheme ("MCS") selection is solely based on device-specific channel conditions. Embodiments disclosed herein may enable a terrestrial radio access network node to adopt an MCS for packet retransmission that matches a first/original MCS used to transmit a packet via a non-terrestrial network node and disregard device-specific communication channel conditions corresponding to the TN RAN node in selecting an MCS. Such enablement may be beneficial wherein the original MCS level and an MCS level that might have been used for retransmission via the NTN node may be close to one another.

Figure 2:
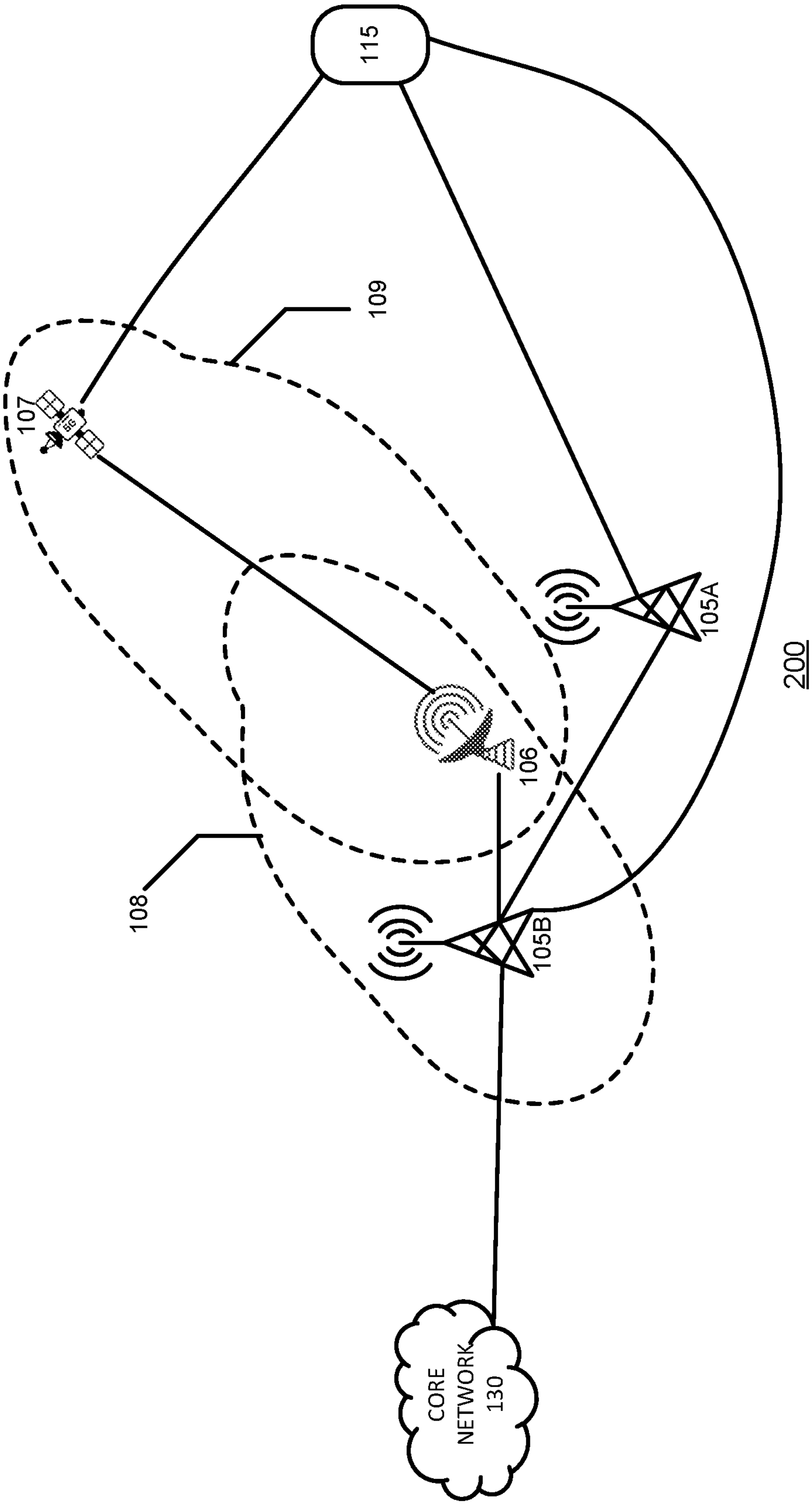
FIG. 2 illustrates an environment with a satellite base station and satellite that are capable of communication of traffic corresponding to a radio access network.

Turning now to FIG. 2, the figure illustrates ground-based RAN node 105, base station 106, and NTN node 107, any one or more of which may be referred to as a radio network node. In reference to some embodiments disclosed herein, reference to a TN node may comprise a reference to node 108, which may comprise one or more of terrestrial RAN node 105 or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105. RAN node 105 may communicate directly with satellite node 107 via communication links 124 or via gateway 106 via links 121 and 122.

Non-Terrestrial Payload Feedback Over Terrestrial Networks and Adaptive Non-Terrestrial Packet Retransmissions.

Figure 3:
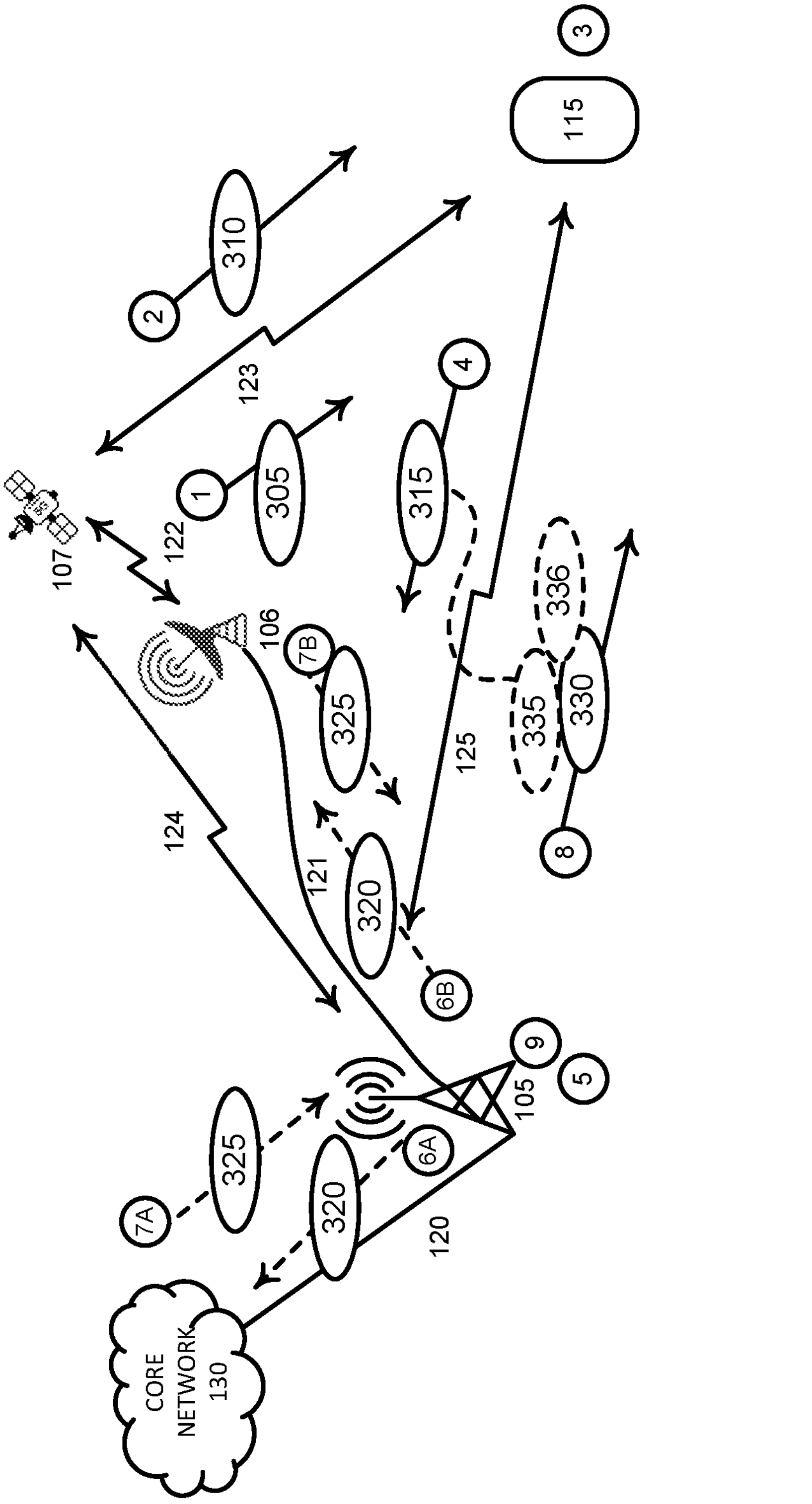
FIG. 3 illustrates an example environment with a terrestrial network node facilitating retransmission of non-terrestrial downlink traffic to a user equipment.
Figure 4:
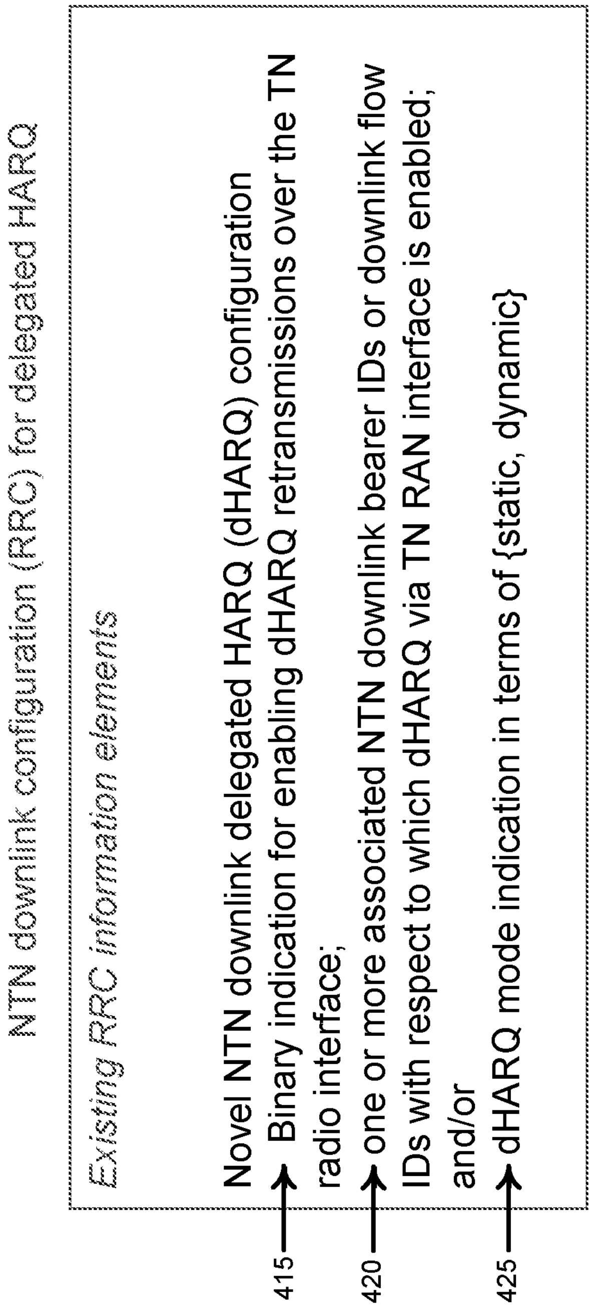
FIG. 4 illustrates an example delegated hybrid automatic repeat request configuration.

Turning now to FIG. 3, at act 1, NTN-capable user equipment 115 may receive from non-terrestrial network node 107 delegated hybrid automatic repeat ("dHARQ") configuration 305. Configuration 305 may be received via a Radio Resource Control ("RRC") signaling message. As shown in FIG. 4, configuration 305 may comprise at least one of: a dHARQ enabled indication 415 indicative that dHARQ retransmission by a TN RAN node via a TN radio interface link is enabled; one or more associated NTN downlink traffic identifiers 420, which may be indicative of one or more downlink bearers or one or more downlink traffic flows with respect to which dHARQ over a TN interface is enabled (as indicated by indication 415); or at least one dHARQ mode indication 425 indicative of static or dynamic dHARQ retransmission.

Continuing with description of FIG. 3, user equipment 115 may receive downlink traffic 310 transmitted by non-terrestrial network node 107 at act 2. At act 3, user equipment 115 may determine that the user equipment may have unsuccessfully received or unsuccessfully decoded at least one protocol data unit, for example a packet, corresponding to downlink traffic 310, and may determine to request, from terrestrial radio access network node 105, retransmission of the at least one unsuccessfully received or unsuccessfully decoded protocol data unit.

Returning to description of FIG. 4, indications 415 and 420 may facilitate NTN RAN node 107 only enabling dHARQ operation with respect to downlink traffic that is associated with a latency-critical Quality-of-Service ("QoS") to minimize TN RAN node 105 being overwhelmed with requests for retransmission of NTN downlink payload 310 that may not be negatively impacted by retransmission by NTN node 107 and an RTT that may correspond thereto. Indication, or information element, 425 may be used to indicate to NTN device 115 to adopt dHARQ with respect to traffic indicated by indication 420, regardless remaining real-time delay budgets, (e.g., static mode) or to dynamically determine, in real time, which NTN downlink packets or traffic flows, indicated by indication 420, with respect to which dHARQ is activated, based on a remaining delay budget corresponding to a packet, or packets, that were unsuccessfully receive from NTN node 107 before an application, corresponding to the UE, that is expecting the unsuccessfully decoded packet is negatively impacted by failure to successfully the packet.

Continuing with discussion of act 3 shown in FIG. 3, if NTN capable UE/WTRU device 115 determines that indication 425 in configuration 305 indicated a static dHARQ mode, and determines that at least one NTN packet, corresponding to downlink traffic 310, has been unsuccessfully decoded, the UE may determine whether a downlink bearer or flow, with which the at least one unsuccessfully decoded packet is associated, is enabled, via indication 415 included in configuration 305, for dHARQ retransmissions via TN RAN node 105. If UE 115 determines that configuration 305 is indicative that dHARQ via terrestrial radio access network node 105 is enabled for the at least one unsuccessfully decoded packet, the UE may transmit a dHARQ request 315 to the terrestrial radio access network node at act 4.

If UE 115 determines at act 3 that indication 425 in configuration 305 indicates dynamic dHARQ mode, and determines that at least one NTN packet, corresponding to downlink traffic 310, has been unsuccessfully decoded, the UE may determine a packet remaining time budget for the retransmission of the at least one unsuccessfully decoded packet to be received before failure to successfully decode the unsuccessfully decoded packet negatively impacts an application corresponding to the UE. The remaining time budget may be determined based on an NTN HARQ RTT (e.g., RTT for UE to transmit a HARQ request to NTN node 107 and to receive a response from the NTN node to the request). A packet remaining time budget may be determined by subtracting a delay associated with decoding a first packet transmission (e.g., decoding delay associated with the at least one unsuccessfully decoded packet) and an expected NTN HARQ RTT from a maximum allowable delay budget associated with the at least one unsuccessfully decoded packet. If UE 115 determines a negative or zero packet remaining time budget, the UE may dynamically enable dHARQ with respect to the at least one unsuccessfully decoded packet (e.g., if the UE determines that requesting HARQ retransmission from the NTN node would result in violation of the delay budget associated with the at least one unsuccessfully decoded packet, the UE may request dHARQ retransmission, by TN RAN node 105, of the at least one unsuccessfully decoded packet). If a positive remaining time budget is determined by user equipment 115 at act 3, the user equipment may avoid transmitting a dHARQ request 315 to radio access network node 105 and may transmit a conventional HARQ request to non-terrestrial network node 107 requesting that the non-terrestrial network node retransmit the at least one unsuccessfully decoded packet.

Figure 5:
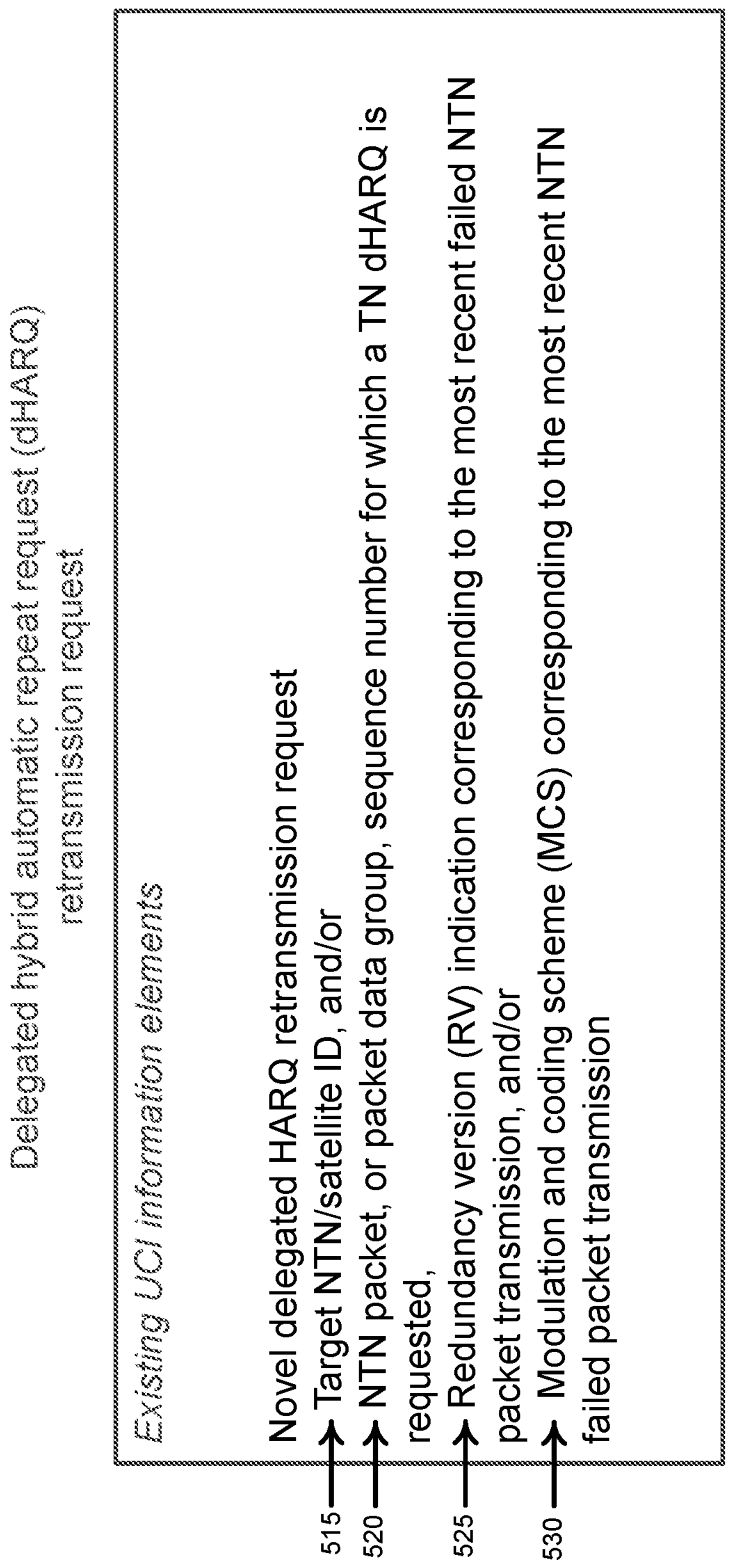
FIG. 5 illustrates an example delegated hybrid automatic repeat request retransmission request.

At act 4, on condition of unsuccessfully decoding at least one packet corresponding to a traffic flow 310 indicated by indication 420 in configuration 305 as being enabled by indication 415 for dHARQ retransmission, NTN capable WTRU/device may transmit, to TN RAN node 105, a TN uplink control information, towards the selected and/or camped on TN RAN node, comprising NTN dHARQ retransmission request 315 requesting retransmitting the at least one unsuccessfully decoded packet. TN RAN node may receive delegated hybrid automatic repeat request 315 (shown in more detail in FIG. 5), from NTN-capable device 115 via uplink TN radio interface 125. Request 315 may facilitate retransmitting failed NTN downlink payload corresponding to downlink traffic 310. As shown in FIG. 5, request 315 may comprise information elements, such as, for example, at least one of: a target NTN/satellite ID 515, an NTN packet sequence number or a packet data group sequence number 520 associated with a packet, or packet group, for which TN dHARQ packet retransmission is requested; a redundancy version ("RV") indication 525 indicative of a first RV applied to a first unsuccessfully decoded NTN packet; or a modulation and coding scheme ("MCS") indication 530 indicative of an MCS applied by NTN node 107 to the first unsuccessfully decoded NTN packet. In an embodiment, indications 525 and 530 may be optional, or not included in a request 315. However, indications 525 and 530 may facilitate TN RAN node 105 fine tune transmission configuration information to be applied to NTN payload/packets requested, by request 315, for retransmission, to match transmission configuration information applied by NTN node 107 to the first NTN payload transmission. (Conventionally, a TN RAN node is not aware of NCS or RV information corresponding to traffic transmitted by another device or equipment.) Using matching MCS and RV information to facilitate retransmission of one or more packets requested, via request 315, for retransmission may facilitate combing of the one or more retransmitted packets with previously transmitted, and unsuccessfully decoded, versions of the packet(s).

At act 5, TN RAN node 105 may determine NTN gateway 106 or an NTN user plane function ("UPF") entity of the core network 130, which may facilitate delivery of NTN payload 310 with an identifier corresponding to satellite node 107 indicated in request 305. TN RAN node 105 may transmit an NTN payload fetching request 320 via determined gateway 106 at act 6B, or at act 6A to core network UPF, which may be a component of core network 130, indicative of one or more sequence numbers corresponding to the NTN packets or packet groups associated with traffic 310 requested for TN retransmission. Request 320 may be referred to as a non-terrestrial payload fetch request and may comprise at least one protocol data unit identifier corresponding to payload being requested for dHARQ retransmission. The arrowed lines indicative in FIG. 3 of request 320 being transmitted to core network 130 or gateway 106 are shown being a dashed line to indicate that request 320 may be directed to the gateway or to the core network, or both.

Unlike conventional ground-based retransmission, wherein a RAN node may be requested to retransmit a packet that the RAN node itself previously transmitted, since TN RAN node 105 shown in the FIG. 3 did not transmit the previously transmitted payload, which was instead transmitted by NTN/satellite 107, the TN RAN node does not have payload requested for retransmission stored in a buffer and thus requests the payload from a component of core network 130 that may be facilitating downlink traffic 310, or from NTN node 107 or associated gateway 106. It will be appreciated that transmission of request 320 may be directed at act 6B to NTN node 107 via gateway 106. TN RAN node 105 may receive NTN traffic payload 325 corresponding to traffic 310 (e.g., corresponding to the at least one protocol data unit identifier included in request 320) via a backhaul interface from NTN node 106, or NTN gateway, at act 7B, and/or from TN core network 130 at act 7A. The arrowed lines indicative in FIG. 3 of payload 325 being transmitted by equipment of core network 130 or gateway 106 are shown being dashed lines to indicate that payload 325 may be received from the gateway or from the core network, or both. Responsive to receiving request 315, terrestrial radio access node 105 may transmit to UE 115, at act 8, retransmission payload 325, received from gateway 106, NTN node 107, or equipment corresponding to core network 130, as retransmission payload 330, which may comprise at least one retransmitted protocol data unit corresponding to at least one protocol data unit sequence number identified in request 315.

In an embodiment, if redundancy version ("RV") indication 525 or modulation and coding scheme ("MCS") information indication 530 are indicative of RV information or MCS information corresponding to a first, or previous, unsuccessfully decoded packet corresponding to downlink traffic 310, being included in request 315 transmitted by UE 115 at act 4, TN RAN node 105 may determine at act 9 to adopt the same MCS indicated in request 315 and may select a next available circularly-rotated RV level (e.g., next available with respect to an RV value indicated in request 315 as corresponding to at least one unsuccessfully decoded packet indicated in request 315), to be used to deliver a retransmission of payload, indicated in request 315. for NTN payload retransmission delivery. For example, TN RAN node 105 may determine at act 9 to adopt the same MCS level used by satellite/NTN node 107 to transmit a first/previous version of a packet associated with downlink traffic 310 and may disregard applying a TN MCS that corresponds to actual channel conditions associated with TN interface link 125 with UE 115 such that packet combining by UE 115 is facilitated (e.g., the user equipment can combine a previously received and unsuccessfully decoded packet and the retransmitted version of the packet). If a different MCS is used for retransmission of a packet than was used for the first/previous transmission of the packet, the UE cannot combine the previously received packet with the retransmitted packet. It will be appreciated that combining a previously transmitted packet that was unsuccessfully decoded with a retransmitted version of the packet may be advantageous because the retransmitted version may not be completely successfully decoded either but the originally/previously transmitted packet and the retransmitted packet may together include enough information to result in successfully decoded packet information and data. At act 8, TN RAN node 105 may transmit a retransmission payload 325, received from gateway 106, NTN node 107, or equipment corresponding to core network 130, as retransmission payload 330. Retransmission payload 330 may be accompanied by downlink control information 335, which may be referred to as a combine indication, to be indicative to NTN-capable user equipment device 115 that dHARQ combining is enabled, wherein TN payload retransmission 330 can be combined with a previously received and unsuccessfully decoded packet/payload indicated in request 315 since retransmission payload 330 is transmitted according to the same MCS and according to an RV based on an RV used by the NTN node to transmit the previous packet/payload that was unsuccessfully decoded. Indication 335 is shown with a dashed line connecting the indication to request 315 to indicate that indication 335 may be transmitted based on MCS or RV information being contained in request 315. On condition of request 315 not being indicative of RV or MCS information corresponding to unsuccessfully decoded payload indicated in request 315, TN RAN node 105 may determine at act 9 to adopt a default MCS that matches channel conditions corresponding to at least one link 125 reported to TN node 105 by UE 115. TN RAN node 105 may select a first available RV level for encoding the NTN retransmission payload. TN RAN node may indicate, via a downlink control information 336, which may be referred to as a non-combine indication, to UE 115 that dHARQ combining is not enabled and that the first/previous NTN payload corresponding to downlink traffic 310 that was unsuccessfully decoded is to be flushed/erased from a buffer corresponding to the user equipment. Indicating to UE to flush/erase a previously received and unsuccessfully decoded packet may be useful if an MCS used to transmit, by NTN node 107, is different from a TN MCS determined based on channel conditions corresponding to at least one link 125 between UE 115 and TN RAN node 105, and thus would result in a decoding failure of such retransmission. Furthermore, dHARQ retransmission 330 may be delivered to, and decoded by, UE 115 faster if an MCS determined based on actual channel conditions is used than if the MCS used for the first/unsuccessfully decoded packet requested via request 315 is used. NTN capable UE/WTRU device 115 may receive retransmitted payload 330 transmitted at act 8. If retransmitted payload 330 is successfully received and decoded, UE 115 may combine the successfully decoded retransmitted payload 330 with the previously received and unsuccessfully decoded payload if an indication 335 accompanies retransmitted payload 330. (Even if retransmission payload is unsuccessfully received or decoded, if request 315 comprises MCS and RV information corresponding to an original/previous transmission/retransmission, the retransmission payload may be combined with the original/previous transmission/retransmission.) If retransmitted payload 330 is unsuccessfully received and decoded and accompanied by an indication 336, UE 115 may flush the previously received and unsuccessfully decoded payload/ packet and decode the received NTN payload retransmission pay load 330. Indications 335 and 336 are illustrated with dashed lines to indicate that either indication may not necessarily be transmitted by terrestrial network node 1052 to user equipment 115.

Figure 6:
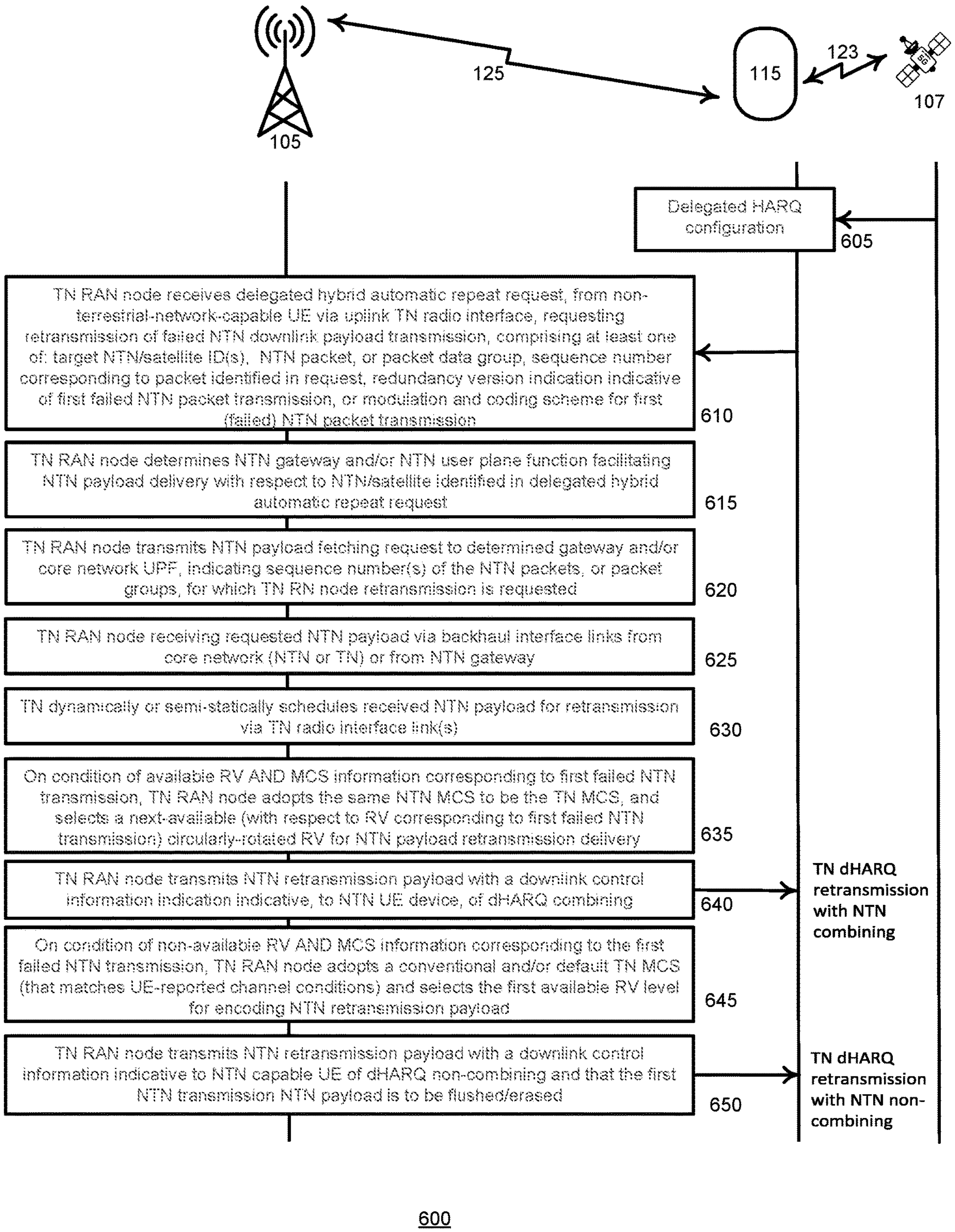
FIG. 6 illustrates a timing diagram of an example embodiment of a terrestrial radio network node facilitating retransmission of unsuccessfully decoded non-terrestrial traffic to a user equipment.

Turning now to FIG. 6, the figure illustrates a timing diagram of an example embodiment method 600. At act 605, NTN-capable UE 115 receives from non-terrestrial network node 107 a delegated HARQ configuration (e.g., configuration 305 shown in FIG. 3). The delegated HARQ configuration may be indicative to UE 115 that delegated hybrid automatic repeat request retransmission via terrestrial radio access network node 105 is enabled. The delegated HARQ configuration may comprise at least one of: a binary indication indicative that dHARQ packet retransmission by TN RAN node 105 via TN radio interface link(s) 125 is enabled; at least one NTN downlink bearer identifier or downlink flow identifier indication of at least one downlink bearer or downlink traffic flow with respect to which dHARQ via the TN interface link(s) is enabled; or a dHARQ mode indication indicative a static mode or a dynamic mode to be used by UE 115 to determine whether to transmit a, dynamic}. At act 610, terrestrial network RAN node may receive a delegated hybrid automatic repeat request ("dHARQ") retransmission request, from non-terrestrial network capable device 115 via at least one uplink TN radio interface corresponding to links 125, requesting retransmission of at least one failed NTN downlink payload packet (e.g., requesting retransmission of at least one unsuccessfully decoded packet). The dHARQ retransmission request may comprise at least one information element comprising at least one of: a target NTN/satellite identifier associated with NTN node 107; at least one NTN packet sequence number, or packet data group sequence number, with respect to which dHARQ retransmission via TN RAN node 105 is requested; or a redundancy version indication indicative of a redundancy version corresponding to the at least one unsuccessfully decoded/failed NTN packet; or a modulation and coding scheme corresponding to the at least one unsuccessfully decoded/failed NTN packet.

At act 615, TN RAN node 105 may determine an NTN gateway or an NTN user plane function that handles/facilitates the NTN payload being delivered by NTN node 107 to UE 115, with respect to which the at least one unsuccessfully decoded packet/payload corresponds. At act 620, TN RAN node 105 may transmit an NTN payload fetch request (e.g., fetch request 320 shown in FIG. 3) to the determined gateway and/or core network UPF, indicating the sequence number(s) indicated in the dHARQ request received at act 610. At act 625, TN RAN node 105 may receive requested NTN payload via backhaul interface links, or microwave interface links, from NTN node 107, and/or from the TN core network or NTN gateway determined at act 615. At act 630, TN node 105 may dynamically or semi-statically schedule NTN payload, received at act 625, for retransmission via TN radio interface links 125.

On condition of the request received at act 615 comprising RV and MCS information corresponding to the at least one unsuccessfully decoded packet with respect to which the request received at act 615 corresponds, TN RAN node 105 may determine, at act 635, to adopt the same MCS used by NTN node 107 to transmit the at least one unsuccessfully decoded packet with respect to which the request received at act 615 corresponds, and may select a next-available (e.g., next with respect an RV indicated in the request received at act 615) circularly-rotated RV level/value to use for retransmission to UE 115 of NTN payload received at act 625. At act 640, TN RAN node may transmit, to UE 115, NTN retransmission payload. The transmitted NTN retransmission payload may comprise, or may be accompanied by, at least one downlink control information message indicative that combining of the dHARQ-requested retransmission payload transmitted it act 640 with the at least one unsuccessfully decoded packet, with respect to which the request received at act 615 corresponds, is enabled.

On condition of RV and MCS information corresponding to the at least one unsuccessfully decoded packet indicated in, and being absent from, the request received at act 615, TN RAN node 105 may adopt a default TN MCS that matches channel conditions corresponding to that at least one link 125 that may have been reported to TN node 105 by UE 115. TN RAN node may select a first available RV for encoding the payload received at act 625 to be retransmitted in response to receive the dHARQ retransmission request at 615. At act 650, TN RAN node may transmit, to UE 115 via at least one link 125, NTN retransmission payload received at act 625. Retransmission payload transmitted at act 650 may comprise, or may be accompanied by, a downlink control information message to be indicative to NTN-capable UE device 115 that combining of the at least one unsuccessfully decoded packet, with respect to which the request received at act 615 requests retransmission, with the retransmission payload is not enabled. User equipment 115 may flush the at least one unsuccessfully decoded packet from a buffer corresponding to the user equipment and may decode the retransmission payload received at act 650.

Figure 7:
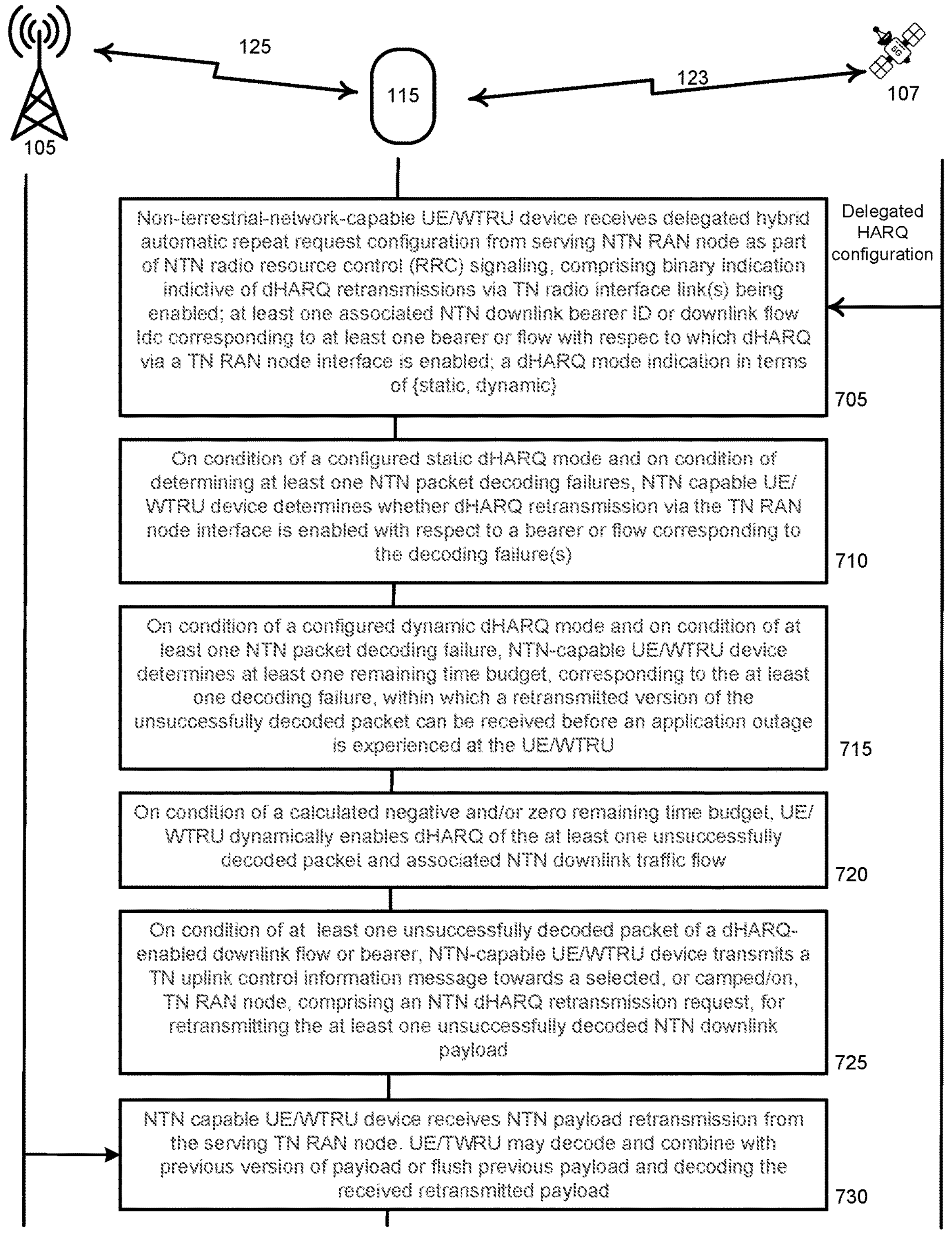
FIG. 7 illustrates a timing diagram of an example embodiment of a user equipment requesting that a terrestrial radio network node facilitate retransmission of unsuccessfully decoded non-terrestrial traffic to the user equipment.

Turning now to FIG. 7, the figure illustrates a timing diagram of an example embodiment method 700. At act 705, NTN-capable UE 115 receives from non-terrestrial network node 107 a delegated HARQ configuration (e.g., configuration 305 shown in FIG. 3). Configuration 305 may be received from serving NTN RAN node 107 as part of NTN radio resource control signaling, and may comprise at least one of: a dHARQ retransmission enabled indication indicative of delegating of HARQ retransmission of at least one packet, unsuccessfully received by UE 115 from NTN node 107, via TN RAN node 105 and TN radio interface link 125 being enabled; at least one NTN downlink bearer identifiers or at least one downlink traffic flow identifiers, indicative of at least one downlink bearer or at least one downlink traffic flow with respect to which dHARQ retransmission via TN RAN node 105 is enabled; at least one dHARQ mode indication in terms of a static or dynamic mode.

In an embodiment, on condition of a dHARQ mode indication being indicative of a configured static dHARQ mode, and NTN-capable UE/WTRU 115 unsuccessfully decoding at least one packet corresponding to a downlink traffic flow being delivered by non-terrestrial network node 107, at act 710 the NTN-capable UE/WTRU device may determine whether a downlink bearer or downlink flow, with respect to which the at least one unsuccessfully packet corresponds, is enabled, according to the configuration received at act 705, for dHARQ retransmissions via terrestrial radio access network node 105.

In an embodiment, on condition of a dHARQ mode indication being indicative of a configured dynamic dHARQ mode, and NTN-capable UE/WTRU 115 unsuccessfully decoding at least one packet corresponding to a downlink traffic flow being delivered by non-terrestrial network node 107, at act 715 NTN-capable UE/WTRU device may determine a remaining time budget for retransmission of the at least one unsuccessfully decoded packet to be received before an application, corresponding to the user equipment, is negatively impacted. The remaining time budget may be determined based on an NTN HARQ round trip time (RTT). For example, a remaining time budget may be determined as a maximum allowable delay budget for packet reception corresponding to the at least one unsuccessfully decoded packet minus a delay corresponding to the unsuccessful decoding of the at least one unsuccessfully decoded packet minus an expected NTN HARQ RTT to transmit a HARQ request to NTN node 107 and to receive a retransmission of a requested unsuccessfully decoded packet from the NTN node responsive to the HARQ request. It will be appreciated that the determination given in the example assumes a first retransmission of and at least one unsuccessfully decoded packet-if the determination at act 715 is being made with respect to a subsequent retransmission of an unsuccessfully decoded packet, additional RTT value(s) and decoding delay(s) may be subtracted. On condition of UE/WTRU 115 determining at act 715 a negative and/or zero remaining time budget, the UE/WTRU may enable, at act 720, dHARQ retransmission, by TN RAN node 105, of the at least one unsuccessfully decoded packet. On condition of UE/WTRU 115 determining at act 715 a positive remaining time budget, the UE/WTRU may request, from NTN node 107, HARQ retransmission of the unsuccessfully decoded packet.

If UE/WTRU has determined that at least one packet corresponding to a downlink flow being delivered by node 107 has been unsuccessfully decoded and that dHARQ retransmission of the at least one unsuccessfully decoded packet by TN RAN node 105 has been determined, at act 725 NTN-capable UE/WTRU device may transmit a TN uplink control information, toward selected and/or camped-on TN RAN node 105, an NTN dHARQ retransmission request (e.g., request 315 described in reference to FIG. 3), for retransmitting the at least one unsuccessfully decoded packet. The NTN dHARQ request may comprise at least one of: a target NTN/satellite identifier corresponding to NTN node 107 that delivered the at least one unsuccessfully decoded packet; at least one packet sequence number, or at least one packet data group sequence number, corresponding to the at least one unsuccessfully decoded packet for which dHARQ retransmission via TN RAN node 105 is requested; a redundancy version indication indicative a redundancy version corresponding to transmission, by NTN node 107, of the at least one unsuccessfully decoded packet for which dHARQ retransmission is requested; or a modulation and coding scheme corresponding to transmission, by the NTN node, of the at least one unsuccessfully decoded packet for which dHARQ retransmission is requested.

At act 730, NTN capable UE/WTRU device 115 may receive, from TN RAN node 105, NTN payload retransmission. UE/WTRU 115 may combine and decode received NTN retransmission payload with original/previous retransmission NTN payload if combining is indicated by TN RAN as being enabled, or the UE/WTRU may flush the at least one unsuccessfully decoded packet/payload and decode the received NTN payload retransmission if combining is indicated by TN RAN node as not being enabled.

Figure 8:
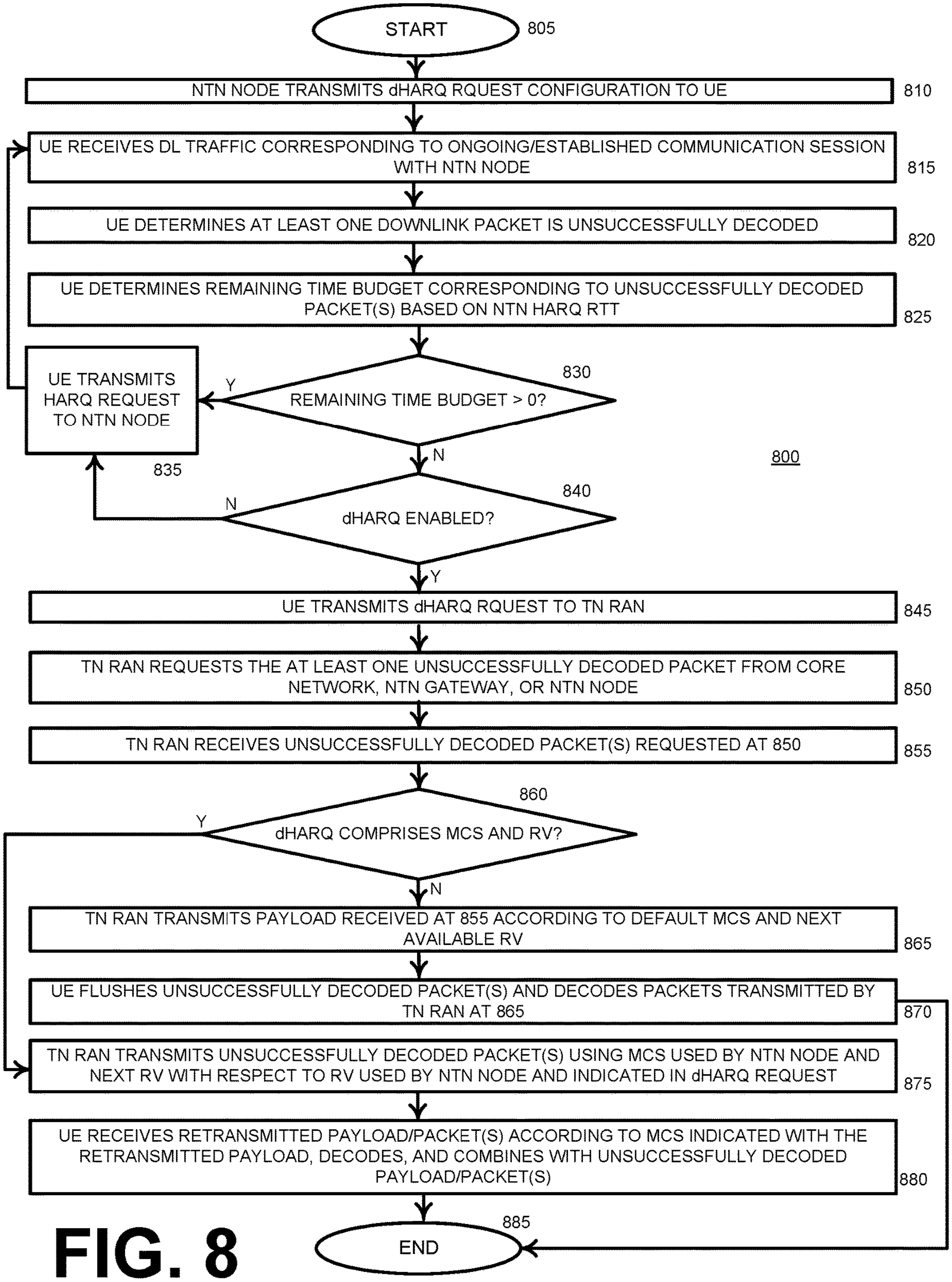
FIG. 8 illustrates a flow diagram of an example embodiment method.

Turning now to FIG. 8, the figure illustrates a flow diagram of an example embodiment 800. Method 800 begins at act 805. At act 810, a non-terrestrial network node may transmit to a user equipment a dHARQ request configuration, for example configuration 305 described in reference to FIG. 3. At act 815, the user equipment may receive downlink traffic corresponding to an ongoing established communication session with the non-terrestrial network node. At act 820, the user equipment may determine that at least one downlink packet corresponding to the ongoing communication session is unsuccessfully decoded by the user equipment. At act 825, the user equipment may determine a remaining time budget corresponding to the unsuccessfully decoded packet, or packets, determined at act 820. The remaining time budget may be based on a round trip time to transmit a HARQ request to the non-terrestrial network node requesting retransmission of the unsuccessfully decoded packet(s). At act 830, the user equipment made determine whether the remaining time budget is a positive time value, or is zero or a negative time value. If a determination made at act 830 is that the remaining time budget corresponding to the unsuccessfully decoded packet(s) is a positive time value, method 800 advances to act 835. At act 835, the user equipment may transmit a HARQ request to the non-terrestrial network node requesting retransmission of the unsuccessfully decoded packet(s), and the user equipment may continue receiving, from the non-terrestrial network node, downlink traffic corresponding to the ongoing communication session with the non-terrestrial network node at act 815.

Returning to description of act 830, if the user equipment determines at act 830 that a remaining time budget corresponding to packet(s) determined to be unsuccessfully decoded at act 820 is zero or less than zero, method 800 advances to act 840. At act 840, the user equipment may determine, based on information contained in the request configuration received today at 810, whether dHARQ retransmission, by a terrestrial radio access network node with respect to the packet(s) determined at act 820 to have been unsuccessfully decoded, is enabled. If a determination is made at act 840 that dHARQ retransmission by a terrestrial radio access network node is not enabled with respect to the packet(s) determined at act 820 to have been unsuccessfully decoded, method 800 advances to act 835 and the user equipment may transmit a HARQ request to the non-terrestrial network node requesting retransmission of the unsuccessfully decoded packet(s) before continuing to receive downlink traffic corresponding to the ongoing communication session with the non-terrestrial network node at act 815.

Returning to description of act 840, if the user equipment determines that dHARQ retransmission by a terrestrial radio access network node is enabled with respect to the packet(s) determined at act 820 to have been unsuccessfully decoded, method 800 advances to act 845. At act 845, the user equipment may transmit to the terrestrial radio access network node a dHARQ retransmission request. Responsive to the dHARQ retransmission request transmitted by the user equipment at act 845, at act 850 the terrestrial radio access network node may request, from computer equipment of a core network, from a non-terrestrial gateway associated with the non-terrestrial network node, or from the non-terrestrial network node, the payload packet(s) determined at act 820 to have been unsuccessfully decoded. Responsive to requesting the unsuccessfully decoded packet(s) at 850, at 855 the terrestrial radio access network node may receive the unsuccessfully decoded packet(s). At act 860, the terrestrial radio access network node may determine whether the dHARQ retransmission request, transmitted by the user equipment at act 845, comprises modulation and coding scheme information and redundancy version information corresponding to a modulation encoding scheme and a redundancy version used by the non-terrestrial network node to transmit the unsuccessfully decoded packet(s) to the user equipment. If a determination is made at act 860 that the dHARQ retransmission request transmitted by the user equipment at act 845 does not comprise modulation and coding scheme information and redundancy version information corresponding to the transmission of the packet(s) that were determined at act 820 to be unsuccessfully decoded, method 800 advances to act 865. At act 865, the terrestrial radio access network node may transmit, to the user equipment, according to a default modulation and coding scheme and a next available redundancy version, the payload received at act 855. The default modulation and coding scheme may be based on channel conditions corresponding to a wireless communication link between the terrestrial radio access network node and the user equipment, wherein the channel conditions may be determined by the terrestrial radio access network node based on a radio parameter measurement report transmitted by the user equipment to the terrestrial radio access network node indicative of the channel conditions. The next available redundancy version may be a next available redundancy version to be used by the terrestrial radio access network node for any downlink transmission to the user equipment, not just to be used for retransmission of the unsuccessfully decoded packet(s). At act 870, the user equipment may flush the unsuccessfully decoded packet(s) from a buffer corresponding to the user equipment and may decode the payload packet(s) transmitted by the terrestrial radio access network node at act 865. Method 800 may advance from act 870 to act 885 and end.

Returning to description of act 860, if the terrestrial radio access network node determines that dHARQ retransmission request transmitted at act 845 comprises modulation and coding scheme information and redundancy version information corresponding to transmission by the non-terrestrial radio access network node of the unsuccessfully received packet(s), method 800 may advance to act 875. At act 875, the terrestrial radio access network node may transmit, to the user equipment, the unsuccessfully decoded packet(s), received by the terrestrial radio access network node at act 855, according to, or based on, modulation and coding scheme information included in the dHARQ retransmission request transmitted by the user equipment at act 845 and according to a redundancy version that is a next redundancy version with respect to the redundancy version indicated in the dHARQ retransmission request transmitted by the user equipment at act 845. At act 880, the user equipment may receive and decode the retransmitted payload/packet(s), transmitted at act 875, according to the modulation and coding scheme indicated by the user equipment in the dHARQ retransmission request if the terrestrial radio access network node indicates that the user equipment is to attempt combining the unsuccessfully decoded payload/packet(s) and the retransmitted payload/packet(s) transmitted at act 875. Method 800 advances from act 880 to act 885 and ends.

Figure 9:
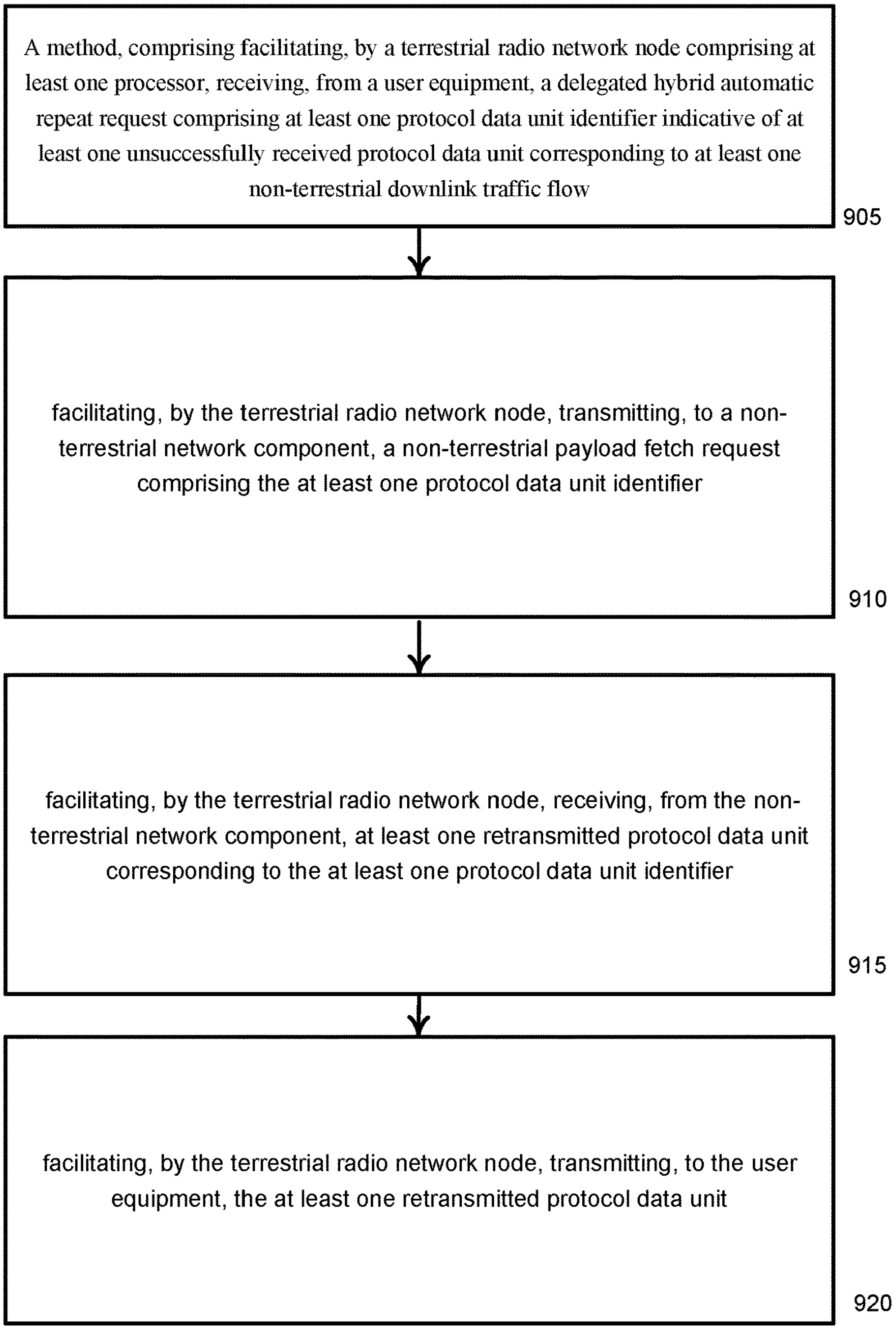
FIG. 9 illustrates a block diagram of an example method embodiment.

Turning now to FIG. 9, the figure illustrates an example embodiment method 900 comprising at block 905 facilitating, by a terrestrial radio network node comprising at least one processor, receiving, from a user equipment, a delegated hybrid automatic repeat request comprising at least one protocol data unit identifier indicative of at least one unsuccessfully received protocol data unit corresponding to at least one non-terrestrial downlink traffic flow; at block 910 facilitating, by the terrestrial radio network node, transmitting, to a non-terrestrial network component, a non-terrestrial payload fetch request comprising the at least one protocol data unit identifier; at block 915 facilitating, by the terrestrial radio network node, receiving, from the non-terrestrial network component, at least one retransmitted protocol data unit corresponding to the at least one protocol data unit identifier; and at block 920 facilitating, by the terrestrial radio network node, transmitting, to the user equipment, the at least one retransmitted protocol data unit.

Figure 10:
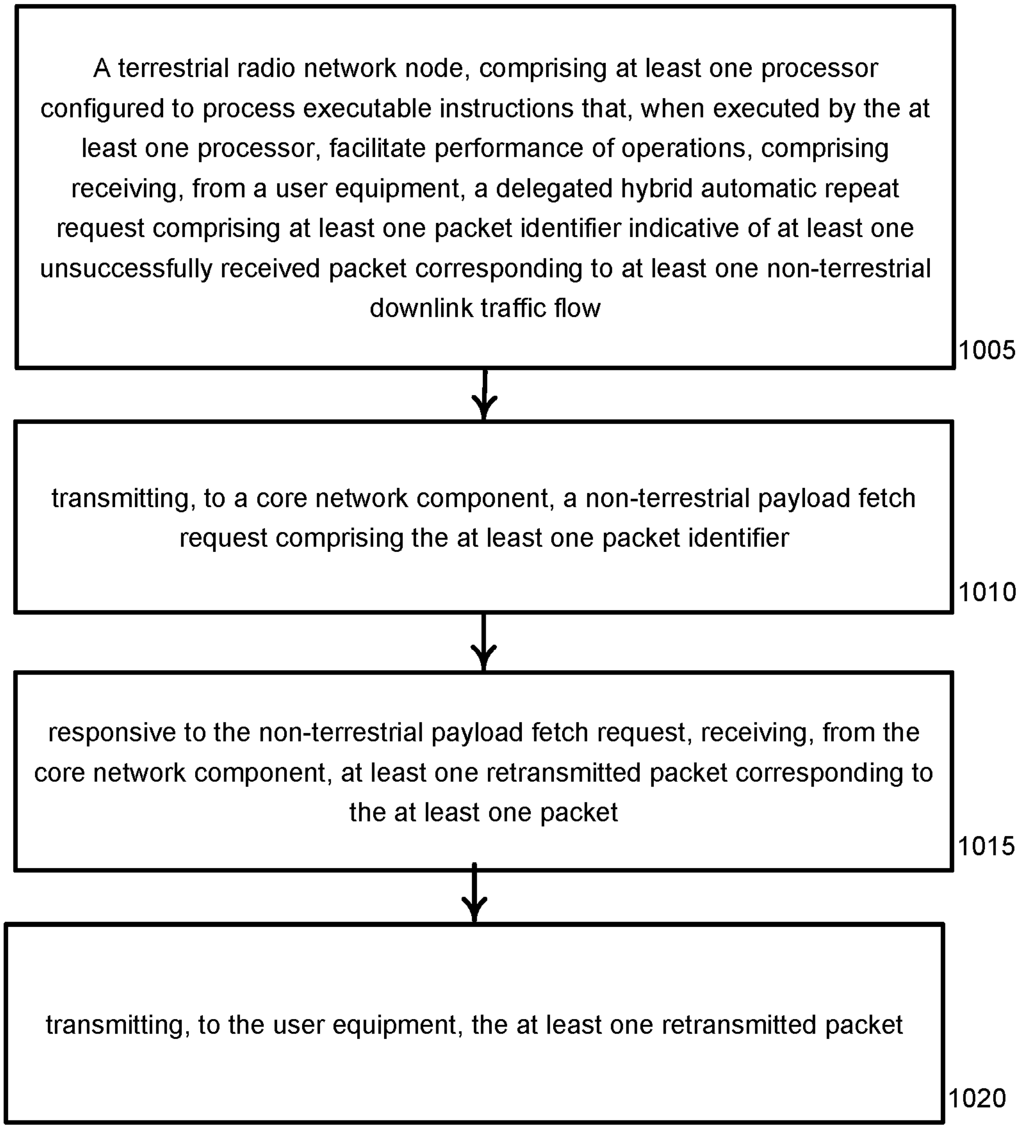
FIG. 10 illustrates a block diagram of an example terrestrial radio network node.

Turning now to FIG. 10, the figure illustrates an example terrestrial radio network node 1000, comprising at block 1005 at least one processor configured to process executable instructions that, when executed by the at least one processor, facilitate performance of operations, comprising receiving, from a user equipment, a delegated hybrid automatic repeat request comprising at least one packet identifier indicative of at least one unsuccessfully received packet corresponding to at least one non-terrestrial downlink traffic flow; at block 1010 transmitting, to a core network component, a non-terrestrial payload fetch request comprising the at least one packet identifier; at block 1015 responsive to the non-terrestrial payload fetch request, receiving, from the core network component, at least one retransmitted packet corresponding to the at least one packet; and at block 1020 transmitting, to the user equipment, the at least one retransmitted packet.

Figure 11:
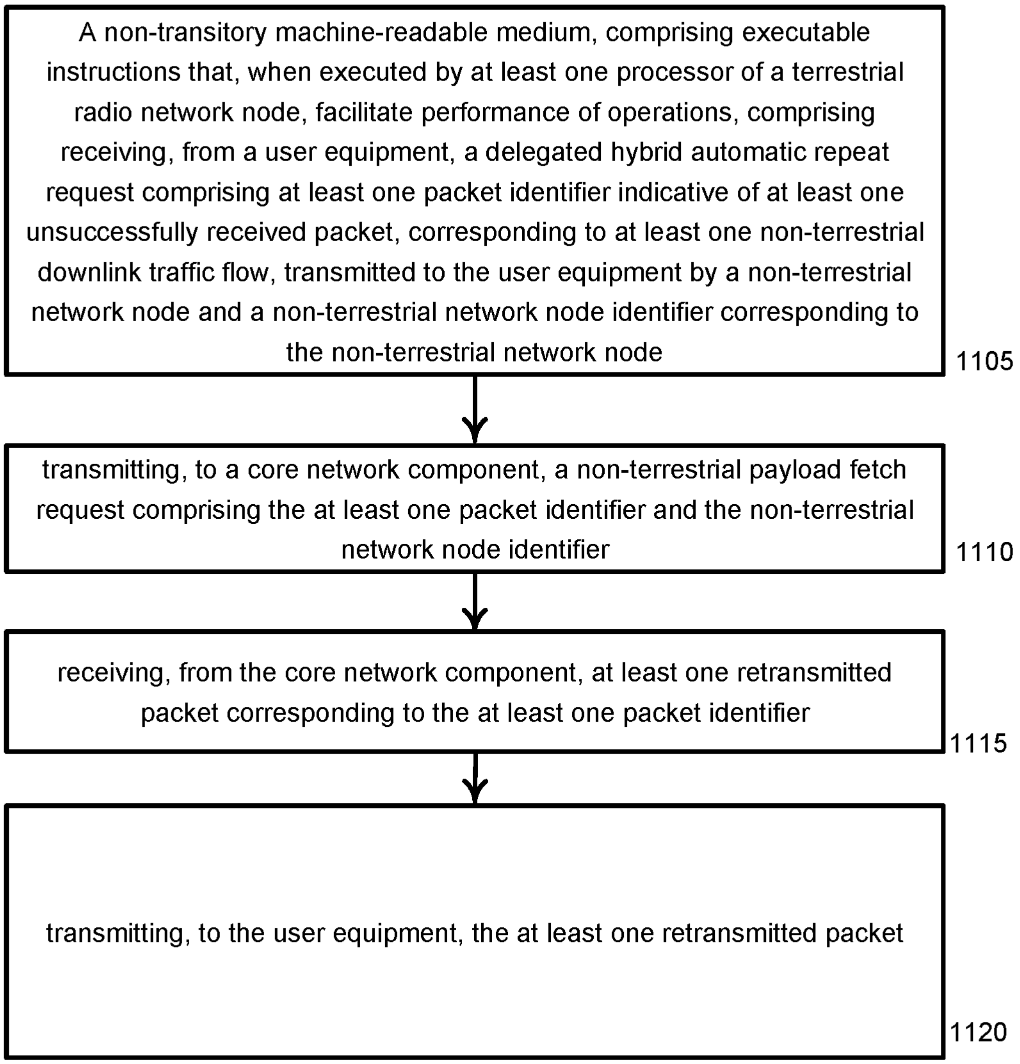
FIG. 11 illustrates a block diagram of an example non-transitory machine-readable medium embodiment.

Turning now to FIG. 11, the figure illustrates a non-transitory machine-readable medium 1100 comprising at block 1105 executable instructions that, when executed by at least one processor of a terrestrial radio network node, facilitate performance of operations, comprising receiving, from a user equipment, a delegated hybrid automatic repeat request comprising at least one packet identifier indicative of at least one unsuccessfully received packet, corresponding to at least one non-terrestrial downlink traffic flow, transmitted to the user equipment by a non-terrestrial network node and a non-terrestrial network node identifier corresponding to the non-terrestrial network node; at block 1110 transmitting, to a core network component, a non-terrestrial payload fetch request comprising the at least one packet identifier and the non-terrestrial network node identifier; at block 1115 receiving, from the core network component, at least one retransmitted packet corresponding to the at least one packet identifier; and at block 1120 transmitting, to the user equipment, the at least one retransmitted packet.

Figure 12:
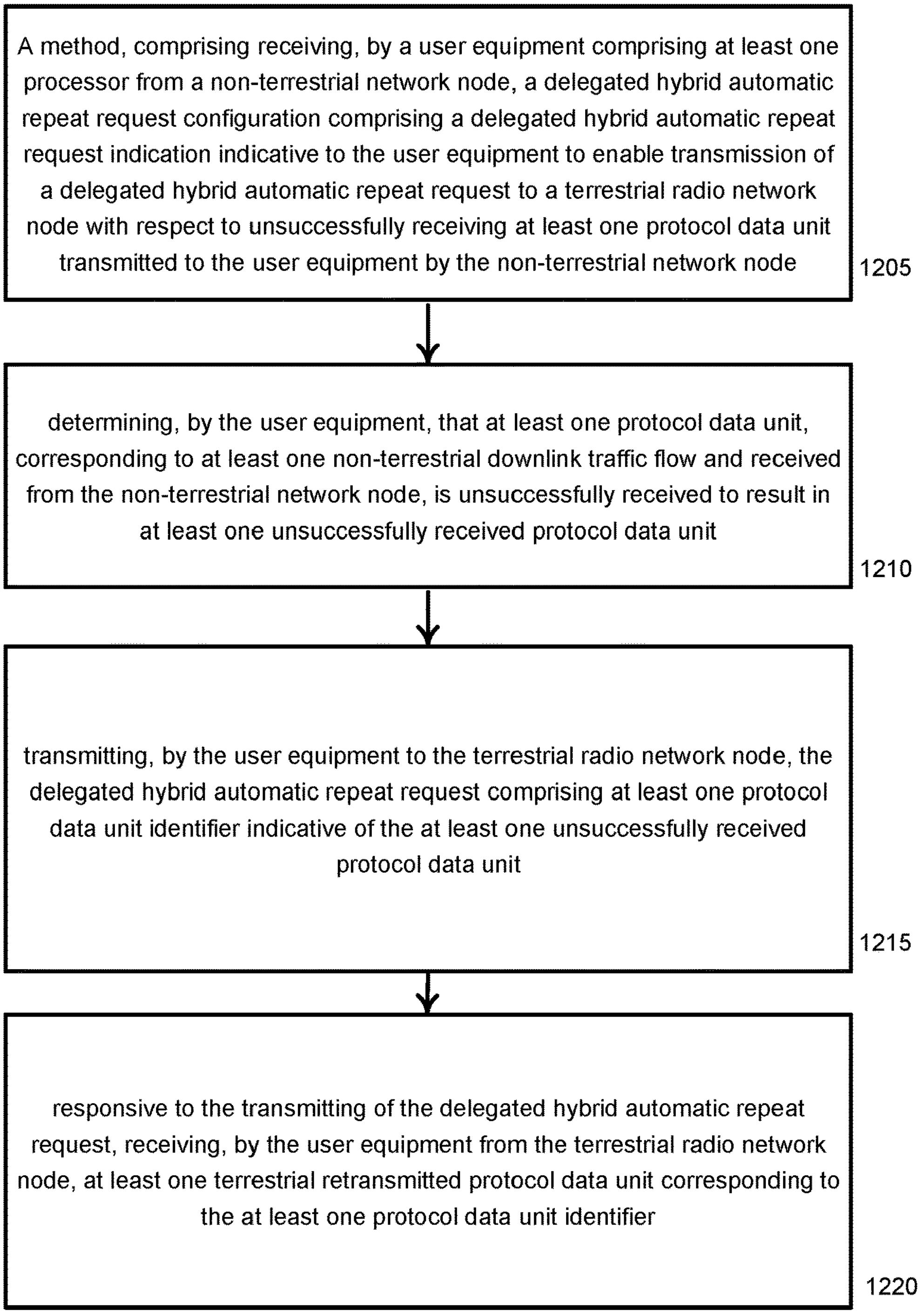
FIG. 12 illustrates a block diagram of an example method embodiment.

Turning now to FIG. 12, the figure illustrates an example embodiment method 1200 comprising at block 1205 receiving, by a user comprising at least one processor, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one protocol data unit transmitted to the user equipment by the non-terrestrial network node; at block 1210 determining, by the user equipment, that at least one protocol data unit, corresponding to at least one non-terrestrial downlink traffic flow and received from the non-terrestrial network node, is unsuccessfully received to result in at least one unsuccessfully received protocol data unit; at block 1215 transmitting, by the user equipment to the terrestrial radio network node, the delegated hybrid automatic repeat request comprising at least one protocol data unit identifier indicative of the at least one unsuccessfully received protocol data unit; and at block 1220 responsive to the transmitting of the delegated hybrid automatic repeat request, receiving, by the user equipment from the terrestrial radio network node, at least one terrestrial retransmitted protocol data unit corresponding to the at least one protocol data unit identifier.

Figure 13:
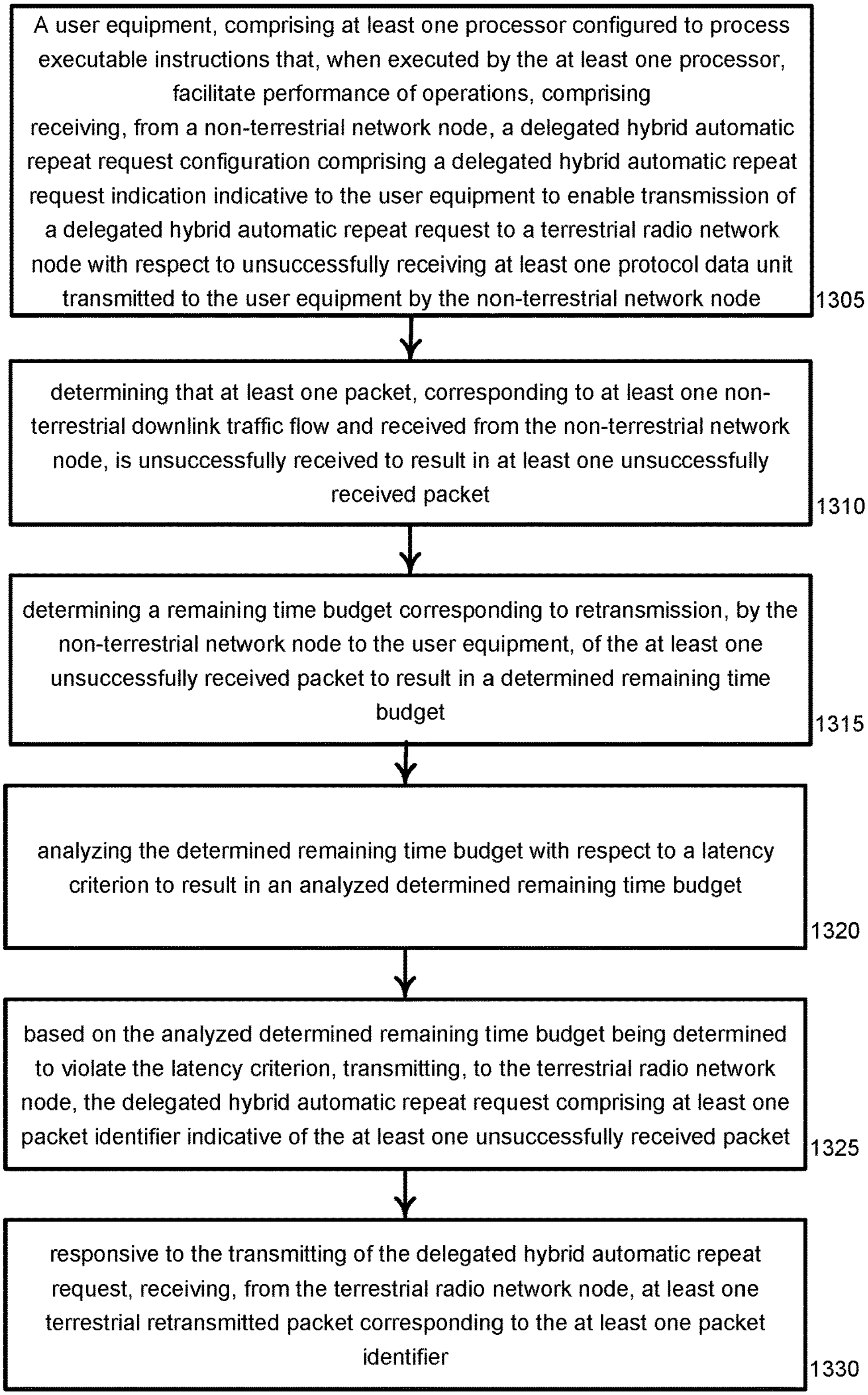
FIG. 13 illustrates a block diagram of an example user equipment.

Turning now to FIG. 13, the figure illustrates an example user equipment 1300, comprising at block 1305 at least one processor configured to process executable instructions that, when executed by the at least one processor, facilitate performance of operations, comprising receiving, from a non-terrestrial network node, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one protocol data unit transmitted to the user equipment by the non-terrestrial network node; at block 1310 determining that at least one packet, corresponding to at least one non-terrestrial downlink traffic flow and received from the non-terrestrial network node, is unsuccessfully received to result in at least one unsuccessfully received packet; at block 1315 determining a remaining time budget corresponding to retransmission, by the non-terrestrial network node to the user equipment, of the at least one unsuccessfully received packet to result in a determined remaining time budget; at block 1320 analyzing the determined remaining time budget with respect to a latency criterion to result in an analyzed determined remaining time budget; at block 1325 based on the analyzed determined remaining time budget being determined to violate the latency criterion, transmitting, to the terrestrial radio network node, the delegated hybrid automatic repeat request comprising at least one packet identifier indicative of the at least one unsuccessfully received packet; and at block 1330 responsive to the transmitting of the delegated hybrid automatic repeat request, receiving, from the terrestrial radio network node, at least one terrestrial retransmitted packet corresponding to the at least one packet identifier.

Figure 14:
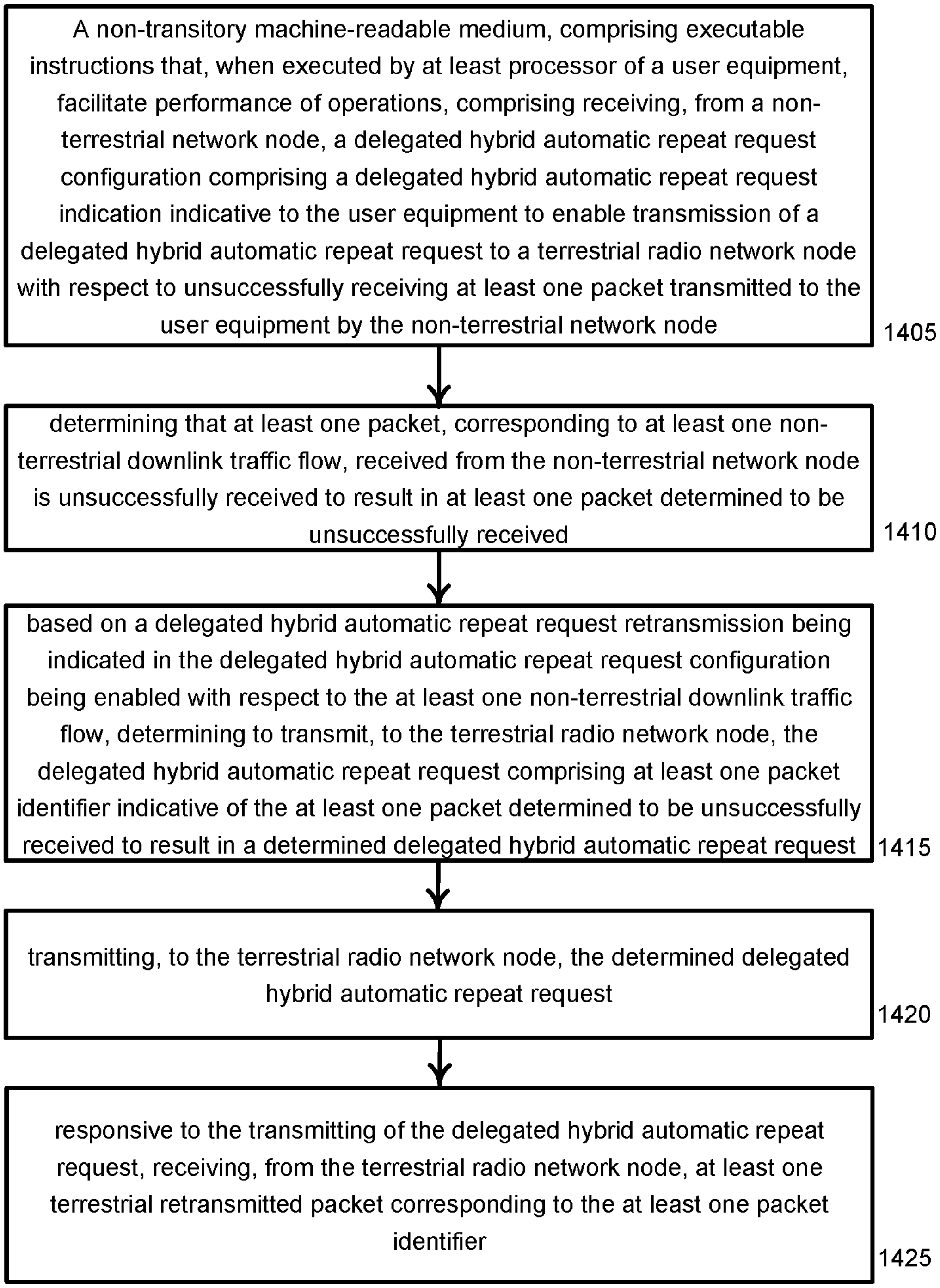
FIG. 14 illustrates a block diagram of an example non-transitory machine-readable medium embodiment.

Turning now to FIG. 14, the figure illustrates a non-transitory machine-readable medium 1400 comprising at block 1405 executable instructions that, when executed by at least one processor of a user equipment, facilitate performance of operations, comprising receiving, from a non-terrestrial network node, a delegated hybrid automatic repeat request configuration comprising a delegated hybrid automatic repeat request indication indicative to the user equipment to enable transmission of a delegated hybrid automatic repeat request to a terrestrial radio network node with respect to unsuccessfully receiving at least one packet transmitted to the user equipment by the non-terrestrial network node; at block 1410 determining that at least one packet, corresponding to at least one non-terrestrial downlink traffic flow, received from the non-terrestrial network node is unsuccessfully received to result in at least one packet determined to be unsuccessfully received; at block 1415 based on a delegated hybrid automatic repeat request retransmission being indicated in the delegated hybrid automatic repeat request configuration being enabled with respect to the at least one non-terrestrial downlink traffic flow, determining to transmit, to the terrestrial radio network node, the delegated hybrid automatic repeat request comprising at least one packet identifier indicative of the at least one packet determined to be unsuccessfully received to result in a determined delegated hybrid automatic repeat request; at block 1420 transmitting, to the terrestrial radio network node, the determined delegated hybrid automatic repeat request; and at block 1425 responsive to the transmitting of the delegated hybrid automatic repeat request, receiving, from the terrestrial radio network node, at least one terrestrial retransmitted packet corresponding to the at least one packet identifier.

Figure 15:
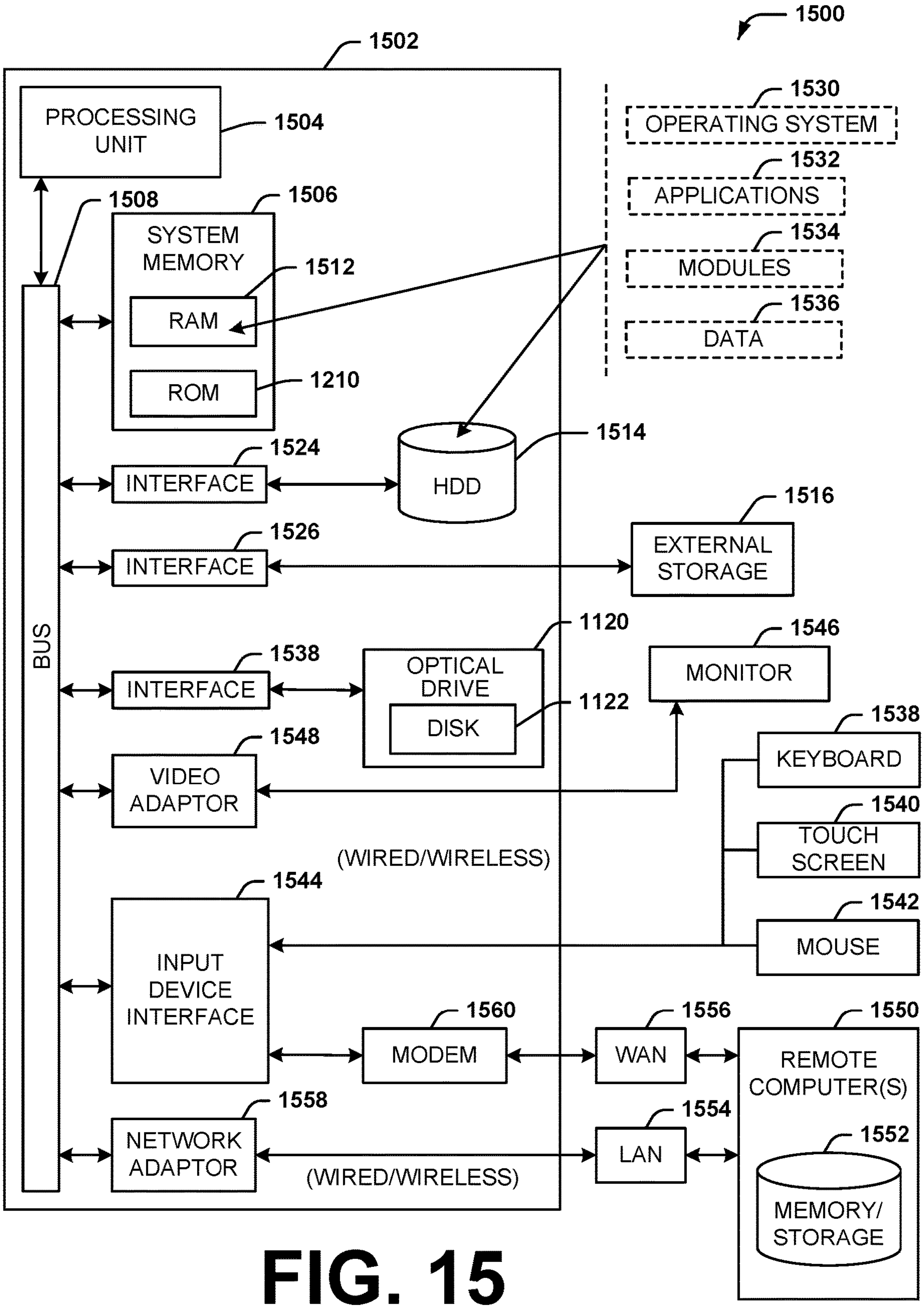
FIG. 15 illustrates an example computer environment.

In order to provide additional context for various embodiments described herein, FIG. 15 and the following discussion are intended to provide a brief, general description of a suitable computing environment 1500 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors and may include a cache memory. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

Computer 1502 further includes an internal hard disk drive (HDD) 1514 (e.g., EIDE, SATA), one or more external storage devices 1516 (e.g., a magnetic floppy disk drive (FDD), a memory stick or flash drive reader, a memory card reader, etc.) and an optical disk drive 1520 (e.g., which can read or write from disk 1522, for example a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid-state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can comprise a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
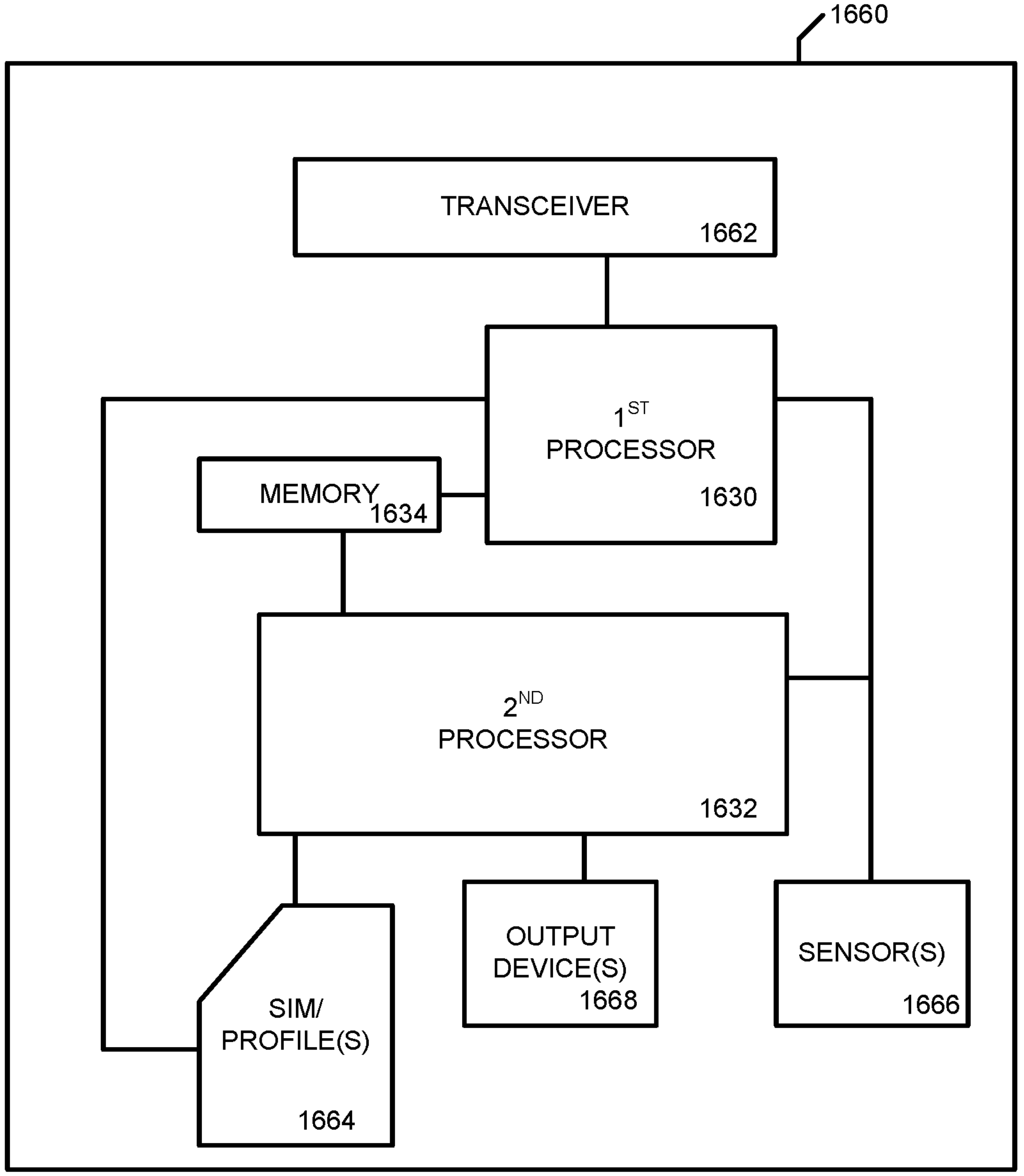
FIG. 16 illustrates a block diagram of an example wireless user equipment.

Turning now to FIG. 16, the figure illustrates a block diagram of an example UE 1660. UE 1660 may comprise a smart phone, a wireless tablet, a laptop computer with wireless capability, a wearable device, a machine device that may facilitate vehicle telematics, an intermediate XR processing unit, and the like. UE 1660 may comprise a first processor 1630, a second processor 1632, and a shared memory 1634. UE 1660 may include radio front end circuitry 1662, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1662 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 16, UE 1660 may also include a SIM 1664, or a SIM profile, which may comprise information stored in a memory (memory 1634 or a separate memory portion), for facilitating wireless communication with RAN 105 or core network 130 shown in FIG. 1. FIG. 16 shows SIM 1664 as a single component in the shape of a conventional SIM card, but it will be appreciated that SIM 1664 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1664 and another device, which may be a component of RAN 105, node 107, or core network 130 shown in FIG. 1). A SIM profile 1664 may also comprise identifying information that is unique to the SIM, or SIM profile, such as, for example, an International Mobile Subscriber Identity ("IMSI") or information that may make up an IMSI.

SIM 1664 is shown coupled to both first processor portion 1630 and second processor portion 1632. Such an implementation may provide an advantage that first processor portion 1630 may not need to request or receive information or data from SIM 1664 that second processor 1632 may request, thus eliminating the use of the first processor acting as a 'go-between' when the second processor uses information from the SIM in performing its functions and in executing applications. First processor 1630, which may be a modem processor or baseband processor, is shown smaller than processor second 1632, which may be a more sophisticated application processor than the first processor, to visually indicate the relative levels of sophistication (i.e., processing capability and performance) and corresponding relative levels of operating power consumption levels between the two processor portions. Keeping the second processor portion 1632 asleep/inactive/in a low power state when UE 1660 does not need the second processor for executing applications and processing data related to an application provides an advantage of reducing power consumption when the UE only needs to use the first processor portion 1630 while in listening mode for monitoring routine configured bearer management and mobility management/maintenance procedures, or for monitoring search spaces that the UE has been configured to monitor while the second processor portion remains inactive/asleep.

UE 1660 may also include sensors 1666, such as, for example, temperature sensors, accelerometers, gyroscopes, barometers, moisture sensors, light sensors, and the like that may provide signals to the first processor 1630 or second processor 1632. Output devices 1668 may comprise, for example, one or more visual displays (e.g., computer monitors, VR appliances, and the like), acoustic transducers, such as speakers or microphones, vibration components, and the like. Output devices 1668 may comprise software that interfaces with output devices, for example, visual displays, speakers, microphones, touch sensation devices, smell or taste devices, and the like, that are external to UE 1660.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a terrestrial radio network node comprising at least one processor, receiving, from a user equipment, a delegated hybrid automatic repeat request comprising at least one protocol data unit identifier indicative of at least one unsuccessfully received protocol data unit corresponding to at least one non-terrestrial downlink traffic flow;

facilitating, by the terrestrial radio network node, transmitting, to a non-terrestrial network component, a non-terrestrial payload fetch request comprising the at least one protocol data unit identifier;

facilitating, by the terrestrial radio network node, receiving, from the non-terrestrial network component, at least one retransmitted protocol data unit corresponding to the at least one protocol data unit identifier;

facilitating, by the terrestrial radio network node, transmitting, to the user equipment, the at least one retransmitted protocol data unit, wherein a redundancy version indication is absent from the delegated hybrid automatic repeat request;

determining, by the terrestrial radio network node, at least one channel condition parameter metric corresponding to a communication link between the terrestrial radio network node and the user equipment;

based on the at least one channel condition parameter metric, determining, by the terrestrial radio network node, a modulation and coding scheme, wherein the facilitating of the transmitting of the at least one retransmitted protocol data unit comprises facilitating the transmitting according to the modulation and coding scheme;

determining, by the terrestrial radio network node, a redundancy version to result in a locally-determined redundancy version, wherein the facilitating of the transmitting of the at least one retransmitted protocol data unit is facilitating the transmitting according to the locally-determined redundancy version; and facilitating, by the terrestrial radio network node, transmitting, to the user equipment, a non-combine indication indicative to the user equipment to avoid combining the at least one retransmitted protocol data unit with the at least one unsuccessfully received protocol data unit.

2. The method of claim 1, wherein the at least one unsuccessfully received protocol data unit is directed to the user equipment.

3. The method of claim 1, wherein the non-terrestrial network component comprises a non-terrestrial network gateway or a user plane function.

4. The method of claim 3, wherein the user plane function is a component of a core network.

5. The method of claim 1, wherein the at least one unsuccessfully received protocol data unit was transmitted to the user equipment by a non-terrestrial network node.

6. The method of claim 1, wherein the at least one unsuccessfully received protocol data unit comprises at least one packet of a group of non-terrestrial downlink packets, and wherein the at least one protocol data unit identifier is indicative of the group of non-terrestrial downlink packets.

7. The method of claim 1, wherein the delegated hybrid automatic repeat request further comprises at least one of: a target non-terrestrial network node identifier corresponding to a non-terrestrial network node that transmitted the at least one unsuccessfully received protocol data unit, a redundancy version indication indicative of a redundancy version corresponding to the at least one unsuccessfully received protocol data unit, or a modulation and coding indication indicative of modulation and coding information used to transmit the at least one unsuccessfully received protocol data unit.

8. The method of claim 7, wherein the facilitating of the transmitting of the at least one retransmitted protocol data unit comprises facilitating the transmitting according to the modulation and coding information used to transmit the at least one unsuccessfully received protocol data unit.

9. The method of claim 7, wherein the redundancy version is a first redundancy version, and wherein the facilitating of the transmitting of the at least one retransmitted protocol data unit comprises facilitating the transmitting according to a second redundancy version that is sequentially subsequent to the first redundancy version.

10. The method of claim 9, further comprising:

facilitating, by the terrestrial radio network node, transmitting, to the user equipment, a delegated hybrid automatic repeat request combine indication indicative to the user equipment to enable combination of the at least one unsuccessfully received protocol data unit and the at least one retransmitted protocol data unit.

11. The method of claim 1, wherein the user equipment is configured, by at least one non-terrestrial radio network node associated with the at least one non-terrestrial downlink traffic flow, with at least one delegated hybrid automatic repeat configuration.

12. The method of claim 11, wherein the at least one delegated hybrid automatic repeat configuration is received via a Radio Resource Control signaling message.

13. The method of claim 11, wherein the at least one delegated hybrid automatic repeat configuration comprises at least one of: a delegated hybrid automatic repeat request enabled indication indicative that delegated hybrid automatic repeat request retransmission by the terrestrial radio network node via a terrestrial radio interface link is enabled; at least one non-terrestrial radio network node downlink traffic identifier indicative of at least one downlink bearer or indicative of at least one downlink traffic flow with respect to which delegated hybrid automatic repeat request over a terrestrial interface is enabled; or at least one delegated hybrid automatic repeat request mode indication indicative of static or dynamic dHARQ retransmission.

14. A terrestrial radio network node, comprising at least one processor configured to process executable instructions that, when executed by the at least one processor, facilitate performance of operations, comprising:

receiving, from a user equipment, a delegated hybrid automatic repeat request comprising at least one packet identifier indicative of at least one unsuccessfully received packet corresponding to at least one non-terrestrial downlink traffic flow;

transmitting, to a core network component, a non-terrestrial payload fetch request comprising the at least one packet identifier;

responsive to the non-terrestrial payload fetch request, receiving, from the core network component, at least one retransmitted packet corresponding to the at least one packet identifier;

transmitting, to the user equipment, the at least one retransmitted packet, wherein a redundancy version indication is absent from the delegated hybrid automatic repeat request;

determining, by the terrestrial radio network node, a redundancy version to result in a locally-determined redundancy version, wherein the transmitting of the at least one retransmitted packet is further facilitated according to the locally-determined redundancy version; and transmitting, to the user equipment, a non-combine indication indicative to the user equipment to prevent the at least one retransmitted packet and the at least one unsuccessfully received packet from being combined.

15. The terrestrial radio network node of claim 14, wherein the delegated hybrid automatic repeat request further comprises at least one of: a target non-terrestrial network node identifier corresponding to a non-terrestrial network node that transmitted the at least one unsuccessfully received packet, a redundancy version indication indicative of a redundancy version corresponding to the at least one unsuccessfully received packet, or a modulation and coding indication indicative of modulation and coding information used to transmit the at least one unsuccessfully received packet.

16. The terrestrial radio network of claim 14, wherein the operations further comprise:

determining at least one channel condition parameter metric corresponding to a communication link between the terrestrial radio network node and the user equipment; and based on the at least one channel condition parameter metric, determining a determined modulation and coding scheme, wherein the transmitting of the at least one retransmitted packet is facilitated according to the determined modulation and coding scheme.

17. The terrestrial radio network node of claim 16, wherein the determined modulation and coding scheme is an original modulation and coding scheme used to transmit the at least one unsuccessfully received packet.

18. A non-transitory machine-readable medium, comprising executable instructions that, when executed by at least one processor of a terrestrial radio network node, facilitate performance of operations, comprising:

receiving, from a user equipment, a delegated hybrid automatic repeat request comprising at least one packet identifier indicative of at least one unsuccessfully received packet, corresponding to at least one non-terrestrial downlink traffic flow, transmitted to the user equipment by a non-terrestrial network node and a non-terrestrial network node identifier corresponding to the non-terrestrial network node;

transmitting, to a core network component, a non-terrestrial payload fetch request comprising the at least one packet identifier and the non-terrestrial network node identifier;

receiving, from the core network component, at least one retransmitted packet corresponding to the at least one packet identifier;

transmitting, to the user equipment, the at least one retransmitted packet, wherein a redundancy version indication is absent from the delegated hybrid automatic repeat request;

determining at least one channel condition parameter metric corresponding to a communication link between the terrestrial radio network node and the user equipment;

based on the at least one channel condition parameter metric, determining, by the terrestrial radio network node, a modulation and coding scheme, wherein the transmitting of the at least one retransmitted packet is facilitated according to the modulation and coding scheme;

determining, by the terrestrial radio network node, a redundancy version to result in a locally-determined redundancy version, wherein the transmitting of the at least one retransmitted packet is further facilitated according to the locally-determined redundancy version; and transmitting, to the user equipment, a non-combine indication indicative to the user equipment to prevent the at least one retransmitted packet and the at least one unsuccessfully received packet from being combined.

19. The non-transitory machine-readable medium of claim 18, wherein the delegated hybrid automatic repeat request further comprises at least one of: a redundancy version indication indicative of a redundancy version corresponding to the at least one unsuccessfully received packet, or a modulation and coding indication indicative of modulation and coding information used to transmit the at least one unsuccessfully received packet.

20. The non-transitory machine-readable medium of claim 19, wherein the redundancy version is a first redundancy version, wherein the locally determined redundancy version is a second redundancy version that is sequentially subsequent, with respect to a circular sequence, to the first redundancy version.

* * * * *